(12) United States Patent
HomChaudhuri et al.

(10) Patent No.: US 9,893,758 B2
(45) Date of Patent: Feb. 13, 2018

(54) SHARING AN ANTENNA BETWEEN LTE-U AND WLAN

(71) Applicant: QUALCOMM Incorporated, San Diego, CA (US)

(72) Inventors: Sandip HomChaudhuri, San Jose, CA (US); Pradeep Kumar Yenganti, Cupertino, CA (US); Ashok Ranganath, San Jose, CA (US); Deepak Dhamdhere, San Jose, CA (US); Viral Modi, San Jose, CA (US); Hong Fan, San Jose, CA (US); Pattabiraman Subramanian, Fremont, CA (US); Gangadhar Burra, Fremont, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/195,938

(22) Filed: Jun. 28, 2016

(65) Prior Publication Data

US 2017/0033829 A1    Feb. 2, 2017

Related U.S. Application Data

(60) Provisional application No. 62/198,632, filed on Jul. 29, 2015.

(51) Int. Cl.
*H04W 72/04* (2009.01)
*H04B 1/401* (2015.01)
(Continued)

(52) U.S. Cl.
CPC ............ *H04B 1/401* (2013.01); *H04B 1/406* (2013.01); *H04L 5/0055* (2013.01);
(Continued)

(58) Field of Classification Search
CPC .......... H04B 1/40; H04B 1/401; H04B 1/406; H04B 15/00; H04L 5/0055;
(Continued)

(56) References Cited

U.S. PATENT DOCUMENTS 9,002,282 B1    4/2015 De La Broise et al.
2011/0111708 A1    5/2011 Tu et al.
(Continued)

OTHER PUBLICATIONS

International Search Report and Written Opinion for International Application No. PCT/US2016/040173, ISA/EPO, Date of Mailing Sep. 21, 2016, 13 pgs.

*Primary Examiner* — Thanh Le
(74) *Attorney, Agent, or Firm* — Toler Law Group

(57) ABSTRACT

In a particular aspect, a method includes receiving, at a long-term evolution (LTE) circuitry of wireless device from a wireless local area network (WLAN) circuitry of the wireless device while the LTE circuitry has control of at least one antenna of the wireless device, a request for control of the at least one antenna. Communications by the LTE circuitry using the at least one antenna corresponds to a first frequency band, communications by the WLAN circuitry using the at least one antenna correspond to a second frequency band, and the first frequency band at least partially overlaps the second frequency band. The method further includes sending a response from the LTE circuitry to the WLAN circuitry based on data included in the request.

30 Claims, 8 Drawing Sheets

(51) Int. Cl.
*H04L 5/00* (2006.01)
*H04W 76/06* (2009.01)
*H04B 1/403* (2015.01)
*H04W 84/12* (2009.01)

(52) U.S. Cl.
CPC ..... *H04W 72/0453* (2013.01); *H04W 76/068* (2013.01); *H04W 84/12* (2013.01)

(58) Field of Classification Search
CPC ........... H04W 52/0225; H04W 76/021; H04W 74/06; H04W 72/0453; H04W 72/1215; H04W 88/06; H04W 76/068
See application file for complete search history.

(56) References Cited

U.S. PATENT DOCUMENTS

| | | | |
|---|---|---|---|
| 2011/0261735 A1* | 10/2011 | Cordeiro | H04W 76/021 370/310 |
| 2012/0020348 A1 | 1/2012 | Haverinen et al. | |
| 2013/0272260 A1 | 10/2013 | Bitran et al. | |
| 2015/0092675 A1* | 4/2015 | Choudhary | H04W 72/1215 370/329 |

* cited by examiner

SHARING AN ANTENNA BETWEEN LTE-U AND WLAN

I. CROSS-REFERENCE TO RELATED APPLICATIONS

The present application claims priority from U.S. Provisional Patent Application No. 62/198,632, filed Jul. 29, 2015, and entitled "SHARING AN ANTENNA BETWEEN LTE-U AND WLAN," which is expressly incorporated herein by reference in its entirety.

II. FIELD

The present disclosure is generally related to wireless communication, and specifically to sharing an antenna for wireless communication.

III. DESCRIPTION OF RELATED ART

Advances in technology have resulted in smaller and more powerful computing devices. For example, a variety of portable personal computing devices, including wireless telephones such as mobile and smart phones, tablets and laptop computers are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing and networking capabilities.

Wireless devices may use various wireless networks to exchange data, such as voice data, video data, packet data, message data, and other data. Some wireless devices may communicate via multiple wireless networks. For example, a wireless device may communicate with a wireless local area network (WLAN) that includes an access point (AP). The wireless device may also support communications with other wireless communication technologies. For example, the AP may support other wireless communication technologies in addition to WLAN, or the wireless device may communicate with another device that supports other wireless communication technologies. As a particular example, the wireless device may communicate with a device that supports long term evolution (LTE) communications.

To reduce size of the wireless device, at least one antenna of the wireless device may be shared between components that communicate using different wireless communication technologies. For example, at least one antenna may be shared between LTE communications and WLAN communications. The at least one antenna may be shared according to various schemes in different situations. To illustrate, when a WLAN mode of the wireless device is enabled and a LTE mode of the wireless device is disabled, the at least one antenna may be reserved for WLAN communications. When the WLAN mode is disabled and the LTE mode is enabled, the at least one antenna may be reserved for LTE communications.

Conflicts may exist when the WLAN mode is enabled and the LTE mode is enabled. To prevent some conflicts, when the LTE mode and the WLAN mode are enabled but the wireless device is not in an associated state with an AP (or another device) via the WLAN, the at least one antenna may be shared using a time division scheme. In accordance with the time division scheme, the antenna may be periodically reserved (e.g., during 1 second of each 5 second period) for WLAN communications and periodically reserved (e.g., during 4 seconds of each 5 second period) for LTE communications. However, some WLAN applications may perform operations using the at least one antenna when the wireless device is not in an associated state with an AP. For example, the wireless device may execute one or more applications that perform preferred network offload (PNO) scans, out of service (OOS) scans, opportunistic roaming scans, "always-on" ranging operations, "locationing" scans or other scans having a time restriction, neighbor-aware network (NAN) discovery scans, NAN beaconing operations, and/or station-to-station multichannel concurrency (STA+STA MCC) operations. Such operations may be performed at different times, such that the operations are incompatible with the time division scheme. Failure to perform the operations may cause one or more applications to fail or to enter an error state.

IV. SUMMARY

The present disclosure describes systems, apparatuses, methods, and computer-readable mediums that enable WLAN circuitry of a wireless device and LTE circuitry of the wireless device that may communicate via a common frequency band to share at least one antenna of the wireless device without using a time division scheme. The WLAN circuitry may be configured to perform wireless communications via a 5 gigahertz (5 GHz) channel (e.g., the common frequency band), and the LTE circuitry may include LTE-Unlicensed (LTE-U) circuitry configured to perform wireless communications via the 5 GHz channel (e.g., the common frequency band). The WLAN circuitry and the LTE circuitry may communicate using request messages and response messages to indicate requests for control of the at least one antenna or to indicate release of control of the at least one antenna. The messages may enable sharing of the at least one antenna based on priority of an application requesting control of the at least one antenna or based on an estimated duration of an operation to be performed using the at least one antenna, as further described herein. Thus, the present disclosure may enable sharing the at least one antenna with greater flexibility than using a time division scheme. The greater flexibility of sharing the at least one antenna may enable applications to perform operations, such as WLAN communications even when the wireless device is not in an associated state with an AP, in time to avoid failure or error. Sharing of the at least one antenna in other situations (e.g., when the WLAN circuitry or the LTE circuitry is disabled, or when the WLAN circuitry is enabled and the wireless devices is in an associated state with another wireless device via a WLAN) are outside the scope of this disclosure. Thus, the wireless device may support WLAN applications that perform PNO scans, opportunistic roaming scans, "always-on" ranging operations, locationing scans or other scans having a time restriction, NAN discovery scans, NAN beaconing operations, or other operations, as well as applications that communicate via LTE-U networks.

To further illustrate, when the WLAN circuitry and the LTE circuitry are enabled, but the wireless device is not in an associated state with another device via WLAN communications, the LTE circuitry may have control of the at least one antenna. Although described as being in an associated state with another device, the wireless device may also (or alternatively) be communicatively connected to another device via a different type of connection, such via an established peer-to-peer connection or via a beaconing process, as non-limiting examples. The LTE circuitry may perform communications via a LTE-U network using the at least one antenna. When the WLAN circuitry determines that an application is requesting to perform wireless communications, the WLAN circuitry sends a request for control of the at least one antenna. The LTE circuitry receives the request and determines whether to grant the request based on data included in the request. The data may include a criticality bit indicating whether the operation corresponding to the request is critical, and the data may indicate a duration of performance of the operation. If the criticality bit has a first value (indicating the operation is critical), the LTE circuitry may grant the request by sending a response (e.g., an acknowledgement (ACK)) to the WLAN circuitry and by releasing control of the at least one antenna. The WLAN circuitry may take control of the at least one antenna to perform the operation and, after performance of the operation is complete, the WLAN circuitry may release control of the at least one antenna back to the LTE circuitry.

If the criticality bit has a second value (indicating the operation is not critical), the LTE circuitry may determine whether to grant the request based on the duration. For example, if the duration fails to exceed a time period prior to a next operation at the LTE circuitry, the LTE circuitry may send the response (e.g., the ACK) to the WLAN circuitry and release control of the at least one antenna. If the duration exceeds the time period, the LTE circuitry may retain control of the at least one antenna and may send the response (e.g., a negative acknowledgement (NACK)) to the WLAN circuitry. Based on the NACK, the WLAN circuitry may re-request the at least one antenna. In some implementations, the WLAN circuitry may set the criticality bit to the first value in a second request to ensure that the request is granted by the LTE circuitry.

In a particular aspect, a method of wireless communication includes receiving, at long-term evolution (LTE) circuitry of a wireless device from wireless local area network (WLAN) circuitry of the wireless device while the LTE circuitry has control of at least one antenna of the wireless device, a request for control of the at least one antenna. Communications by the LTE circuitry using the at least one antenna correspond to a first frequency band, communications by the WLAN circuitry using the at least one antenna correspond to a second frequency band, and the first frequency band at least partially overlaps the second frequency band. The method further includes sending a response from the LTE circuitry to the WLAN circuitry based on data included in the request.

In a particular aspect, an apparatus includes at least one antenna. The apparatus includes long-term evolution (LTE) circuitry configured to be coupled to the at least one antenna and configured to communicate via a first frequency band. The apparatus includes wireless local area network (WLAN) circuitry configured to be coupled to the at least one antenna and to communicate via a second frequency band. The first frequency band at least partially overlaps the second frequency band. The apparatus further includes an interface configured to enable communications between the LTE circuitry and the WLAN circuitry, where the communications include a response from the LTE circuitry to the WLAN circuitry based on data included in a request from the WLAN circuitry for control of the at least one antenna.

In a particular aspect, an apparatus includes means for performing long term evolution (LTE) communications via at least one antenna and via a first frequency band. The apparatus includes means for performing wireless local area network (WLAN) communications via the at least one antenna and via a second frequency band. The first frequency band at least partially overlaps the second frequency band. The apparatus further includes means for sending a response to the means for performing WLAN communications based on data included in a request received from the means for performing WLAN communications while the means for performing LTE communications has control of the at least one antenna. The request is for control of the at least one antenna.

In another particular aspect, a non-transitory computer-readable medium stores instructions that, when executed by a processor, cause the processor to receive, at long-term evolution (LTE) circuitry of wireless device from wireless local area network (WLAN) circuitry of the wireless device while the LTE circuitry has control of at least one antenna of the wireless device, a request for control of the at least one antenna. Communications by the LTE circuitry using the at least one antenna correspond to a first frequency band, communications by the WLAN circuitry using the at least one antenna correspond to a second frequency band, and the first frequency band at least partially overlaps the second frequency band. The instructions further cause the processor to send a response from the LTE circuitry to the WLAN circuitry based on data included in the request.

One particular advantage provided by at least one of the disclosed aspects is sharing of at least one antenna with more flexibility than using a time division scheme. This method of sharing enables the WLAN circuitry to request control of the at least one antenna when critical operations are to be performed. For example, the WLAN circuitry may send a request (with the criticality bit having the first value) to the LTE circuitry, and the LTE circuitry may release control of the at least one antenna to the WLAN circuitry. Thus, critical operations are able to be performed in time to avoid failure or an error. Additionally, if the criticality bit has the second value, the LTE circuitry determines whether to grant the request based on a duration of an operation to be performed using the at least one antenna. In this manner, the LTE circuitry may release control of the at least one antenna to the WLAN circuitry during periods when the LTE circuitry is not performing any operations via the at least one antenna. Thus, the at least one antenna may be shared more efficiently by allowing the WLAN circuitry to have control during periods of inactively at the LTE circuitry.

Other aspects, advantages, and features of the present disclosure will become apparent after review of the entire application, including the following sections: Brief Description of the Drawings, Detailed Description, and the Claims.

VI. DETAILED DESCRIPTION

Figure 1:
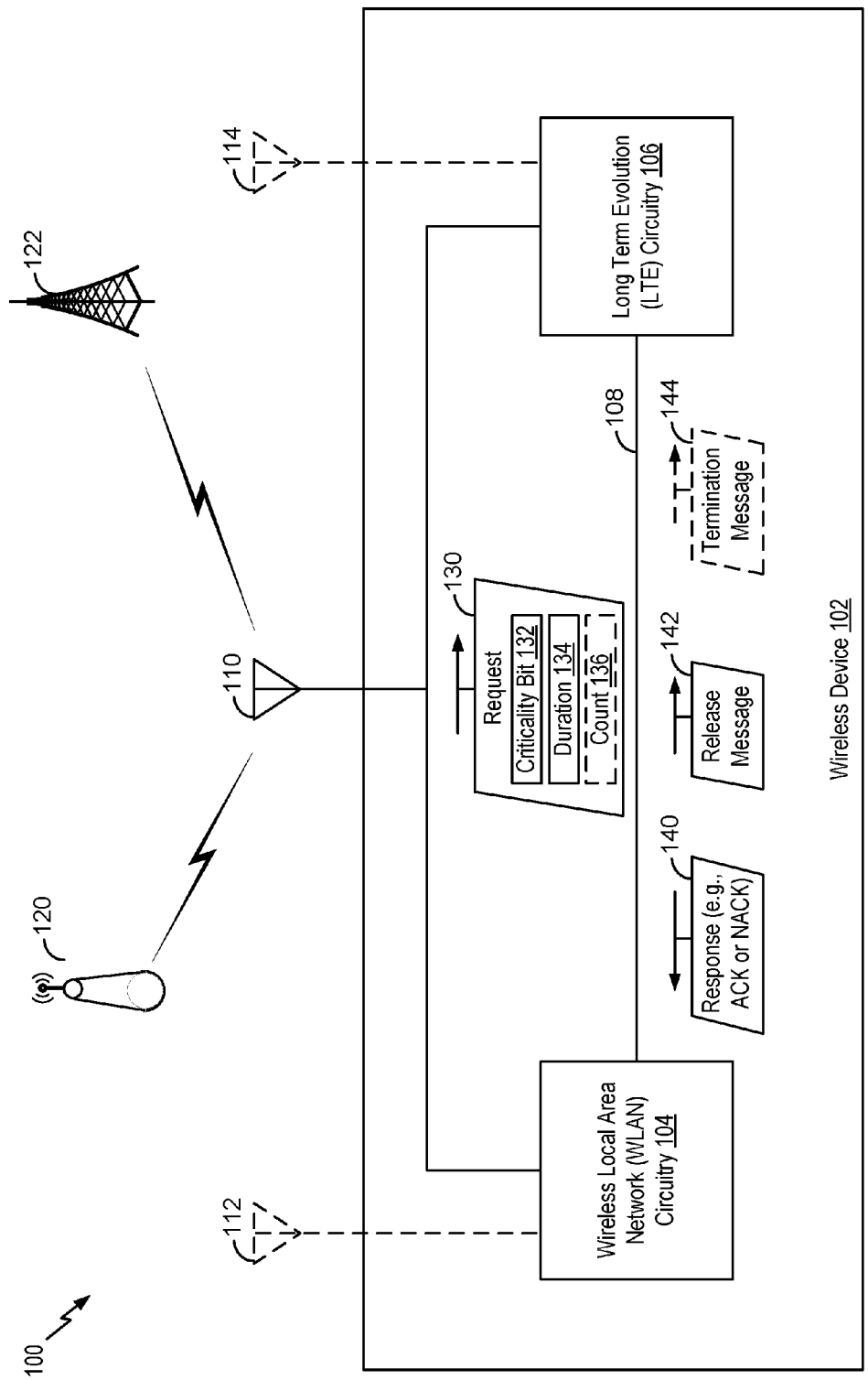
FIG. 1 is a block diagram of an illustrative aspect of a system supporting sharing at least one antenna of a wireless device between wireless local area network (WLAN) circuitry and long term evolution (LTE) circuitry.

Particular aspects of the present disclosure are described below with reference to the drawings. In the description, common features are designated by common reference numbers throughout the drawings. As used herein, various terminology is used for the purpose of describing particular implementations only and is not intended to be limiting. For example, the singular forms "a," "an," and "the" are intended to include the plural forms as well, unless the context clearly indicates otherwise. It may be further understood that the terms "comprises" and "comprising" may be used interchangeably with "includes" or "including." Additionally, it will be understood that the term "wherein" may be used interchangeably with "where." As used herein, "exemplary" may indicate an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term).

Particular aspects of the present disclosure are described below with reference to the drawings. In the description, common features are designated by common reference numbers throughout the drawings.

The present disclosure describes sharing of at least one antenna between wireless local area network (WLAN) circuitry of a wireless device and long term evolution (LTE) circuitry of the wireless device. When a WLAN mode of the wireless device and a LTE mode of the wireless device are enabled and the wireless device is not in an associated state with another wireless device via the WLAN circuitry, the LTE circuitry may have control of the at least one antenna. Although described as being in an associated with another device, such description is for convenience and is not limiting. For example, the wireless device may be communicatively connected to another device using other types of connections. As an example, the wireless device may have established a peer-to-peer connection with another device. As another example, the wireless device may announce an availability for communication (e.g., via a beacon message or other message) to other devices. By announcing the availability for communication, the wireless device begins a beaconing process that may result in a connection with another device. In other implementations, other types of connections may be established (e.g., connections associated with other network topologies). Thus, for convenience, an "associated state" may refer to any type of communicative connection between two devices.

The WLAN circuitry may send a request to the LTE circuitry when an application associated with the WLAN circuitry requests use of the at least one antenna. The request may include a criticality bit and may indicate a duration of an operation to be performed using the at least one antenna. The LTE circuitry may determine whether to release control of the at least one antenna (e.g., grant the request) based on the criticality bit and the duration. The LTE circuitry may signal the WLAN circuitry using a response (e.g., an acknowledgement or a negative acknowledgement) to inform the WLAN circuitry whether control of the at least one antenna is being released. By using a message-based scheme to share the at least one antenna, the at least one antenna may be shared with more flexibility than using a time division scheme. Additionally, because some requests may be indicated as critical (and thus automatically granted by the LTE circuitry), the WLAN circuitry may be able to perform certain operations on an as needed basis. Thus, WLAN applications performing unscheduled critical operations may be supported by the message-based sharing scheme.

Referring to FIG. 1, a block diagram of an illustrative aspect of a system supporting sharing at least one antenna of a wireless device between wireless local area network (WLAN) circuitry and long term evolution (LTE) circuitry is depicted and generally designated 100. The system 100 includes a wireless device 102, an access point (AP) 120, and a base station 122.

The AP 120 may be part of a WLAN and may be configured to provide access to the WLAN to wireless devices. For example, if the wireless device 102 is in an associated state with the AP 120, the AP 120 may enable the wireless device 102 to communicate with other wireless devices via the WLAN. The AP 120 (and other APs or wireless devices not illustrated) may represent a basic service set (BSS) or an extended service set (ESS). The AP 120 may be configured to operate in accordance with a wireless standard. For example, the AP 120 may be configured to operate in accordance with an Institute of Electrical and Electronics Engineers (IEEE) 802.11 standard, a Wi-Fi Alliance standard, other standards, or a combination thereof. Because the AP 120 may operate in accordance with an IEEE 802.11 standard, the WLAN may be referred to as a "Wi-Fi" network. In a particular implementation, the AP 120 may be configured to operate in a particular frequency band referred to as "the 5 gigahertz (GHz) unlicensed spectrum." The 5 GHz unlicensed spectrum may refer to the frequency band between approximately 5 GHz and approximately 6 GHz (e.g., 5150 megahertz (MHz) to 5850 MHz).

The base station 122 may be part of a cellular network and may support various types of wireless communications. Particularly, the base station 122 may be a LTE base station. The LTE base station may be part of a LTE network and may support LTE communications. In a particular implementation, the base station 122 is a LTE-Unlicensed (LTE-U) base station. LTE-U refers to LTE networks that operate in the particular frequency band referred to as the 5 GHz unlicensed spectrum. In a particular implementation, the base station 122 is configured to operate in one of three frequency bands: 5150-5250 MHz ("U-NII-1"), 5250-5725 MHz ("U-NII-2"), or 5725-5850 MHz ("U-NII-3").

The wireless device 102 may include or correspond to mobile phones, satellite phones, laptop computers, tablet computers, palm computers, personal digital assistants (PDAs), computerized watches, multimedia devices, peripheral devices, data storage devices, a vehicle (or a component thereof), or a combination thereof. The wireless device 102 includes wireless local area network (WLAN) circuitry 104, long term evolution circuitry (LTE) 106, an interface 108, and at least one antenna 110. The interface 108 may include a shared memory interface, a wireless coexistence interface 2 (WCI-2), a general purpose input-output (GPIO) interface, a bus, or a different interface. The at least one antenna 110 may be shared by the WLAN circuitry 104 and the LTE circuitry 106, as further described herein. In a particular implementation, the LTE circuitry 106 and the WLAN circuitry 104 may be integrated within a modem of the wireless device 102. For example, the wireless device 102 may include a single modem, and the modem may include the WLAN circuitry 104 and the LTE circuitry 106.

The at least one antenna 110 may include a single antenna or two or more antennas. In a particular implementation, the at least one antenna 110 includes two or more antennas, and the wireless device 102 is configured to communicate using multiple-input, multiple-output (MIMO) techniques via the two or more antennas. In some implementations, the wireless device 102 may include dedicated (e.g., unshared) antennas. For example, the wireless device 102 may include a first dedicated antenna 112 and a second dedicated antenna 114. The WLAN circuitry 104 may be configured to operate the first dedicated antenna 112, and the LTE circuitry 106 may be configured to operate the second dedicated antenna 114. In other implementations, the wireless device 102 does not include the dedicated antennas 112 and 114.

Additionally, the wireless device 102 may include a processor and a memory (not illustrated). The processor may include or correspond to a central processing unit (CPU), a digital signal processor (DSP), a network processing unit (NPU), or other processing devices. The memory may include or correspond to a random access memory (RAM), a read-only memory (ROM), a set of registers, a set of storage elements, or a combination thereof. The wireless device 102 may also include at least one wireless interface configured to send and receive data via the at least one antenna 110.

The WLAN circuitry 104 may include circuitry configured to receive or send data via a WLAN using the at least one antenna 110. For example, the WLAN circuitry 104 may include or correspond to processors or controllers, transceiver(s), receiver(s), transmitter(s), antenna interface circuit(s), switch(es), switch control circuitry, duplexer(s), transmit filter(s), receive filter(s), matching circuit(s), mixer(s), amplifier(s), oscillator(s), local oscillator (LO) generator(s), phase-locked loop(s) (PLLs), other circuitry, or a combination thereof. The WLAN circuitry 104 may be configured to operate in accordance with a wireless standard. For example, the WLAN circuitry 104 may be configured to operate in accordance with an IEEE 802.11 standard (e.g., a Wi-Fi standard), a Wi-Fi Alliance standard, other standards, or a combination thereof. In a particular implementation, the WLAN circuitry 104 may be configured to send or receive data via a second frequency band. The second frequency band may include the 5 GHz channel. In other implementations, the WLAN circuitry 104 may be configured to send or receive data via a 2.4 GHz channel or other frequency spectrums.

The LTE circuitry 106 may include circuitry configured to receive or send data via a LTE network using the at least one antenna 110. For example, the LTE circuitry 106 may include or correspond to processors or controllers, transceiver(s), receiver(s), transmitter(s), antenna interface circuit(s), switch(es), switch control circuitry, duplexer(s), transmit filter(s), receive filter(s), matching circuit(s), mixer(s), amplifier(s), oscillator(s), local oscillator (LO) generator(s), phase-locked loop(s) (PLLs), other circuitry, or a combination thereof. The LTE circuitry 106 may be configured to operate in accordance with a LTE communication technique or standard. In a particular implementation, the LTE circuitry 106 may include LTE-U circuitry. The LTE-U circuitry may be configured to send or receive data via a first frequency band. The first frequency band may include the 5 GHz unlicensed spectrum. In a particular implementation, the LTE circuitry 106 is configured to send or receive data via one of three frequency bands: 5150-5250 MHz ("U-NII-1"), 5250-5725 MHz ("U-NII-2"), or 5725-5850 MHz ("U-NII-3"). Thus, in some implementations, the first frequency band may at least partially overlap the second frequency band. The overlapping frequency bands may be referred to as a "common frequency band." In other implementations, the LTE circuitry 106 may be configured to send or receive data via other frequency spectrums. In these other implementations, the first frequency band and the second frequency band may not overlap.

Because the WLAN circuitry 104 and the LTE circuitry 106 may both be configured to send or receive data using the at least one antenna 110 via a common frequency band (e.g., overlapping frequency bands, such as one or more sub-bands within the 5 GHz unlicensed spectrum and 5 GHz channel corresponding to WLAN), coexistence issues may arise. To avoid coexistence problems, the wireless device 102 may be configured such that one of the WLAN circuitry 104 or the LTE circuitry 106 has control of the at least one antenna 110 at a particular time. Having control of the at least one antenna 110 may refer to the WLAN circuitry 104 or the LTE circuitry 106 either using, or being configured to use, the at least one antenna 110 while the other of the WLAN circuitry 104 and the LTE circuitry 106 is unable to use the at least one antenna 110. In a particular implementation, the wireless device 102 may include a switch configured to selectively couple the at least one antenna 110 to the WLAN circuitry 104 or the LTE circuitry 106. For example, the LTE circuitry 106 may be configured to maintain or regain control of the at least one antenna by causing the switch to couple the at least one antenna to the LTE circuitry 106. In other implementations, the wireless device 102 may not include a switch, and the WLAN circuitry 104 and the LTE circuitry 106 may be configured such that, when one of the WLAN circuitry 104 and the LTE circuitry 106 has control of the at least one antenna 110, the other of the WLAN circuitry 104 and the LTE circuitry 106 does not use the at least one antenna 110. The LTE circuitry 106 or the WLAN circuitry 104 may indicate control of the at least one antenna 110 via messaging described further herein.

The wireless device 102 may be configured to share the at least one antenna 110 between the WLAN circuitry 104 and the LTE circuitry 106 based on operating modes of the wireless device 102. The operating modes may include a WLAN mode and a LTE mode. The WLAN mode and the LTE mode may each be enabled or disabled, and the operating modes are not exclusive (e.g., the WLAN mode and the LTE mode may both be enabled concurrently). The at least one antenna 110 may be shared based on the WLAN mode and the LTE mode. To illustrate, when both the WLAN mode and the LTE mode are disabled, the WLAN circuitry 104 has control of the at least one antenna 110. When the WLAN mode is disabled and the LTE mode is enabled, the LTE circuitry 106 has control of the at least one antenna 110. When the WLAN mode is enabled and the LTE mode is disabled, the WLAN circuitry 104 has control of the at least one antenna 110. When the WLAN mode is enabled, the LTE mode is enabled, and the wireless device 102 is in an associated state (e.g., is communicatively connected) with another wireless device via a WLAN, the WLAN circuitry 104 has control of the at least one antenna 110 and a Radio Link Failure (RLF) state is triggered at the LTE circuitry 106. For example, when the wireless device 102 is in an associated state with the AP 120 via a WLAN provided by the AP 120 and both the WLAN mode and the LTE mode are enabled, the WLAN circuitry 104 has control of the at least one antenna 110 and a RLF state is triggered at the LTE circuitry 106. Although described herein as being in an associated state with the AP 120, in other implementations, the wireless device 102 may be in an associated state (e.g., may be communicatively connected) with other devices, such as other stations or clients (e.g., via a peer-to-peer connection, as a non-limiting example).

When the WLAN mode is enabled, the LTE mode is enabled, and the wireless device 102 is not in an associated state with any other wireless device via a WLAN, the LTE circuitry 106 has control of the at least one antenna 110, but the at least one antenna 110 may be shared, as further described herein. Other wireless devices may share an antenna between WLAN circuitry and LTE circuitry according to a time division scheme. For example, WLAN circuitry has control of the antenna for one second of each five second interval, and the LTE circuitry has control of the antenna for the rest of the five interval. This time division scheme may enable sharing of an antenna between some WLAN applications and LTE applications.

However, the time division scheme may not be flexible to support sharing with some WLAN applications. For example, some WLAN applications may perform critical operations at times when the LTE circuitry has control (e.g., four seconds of each five second interval). If the WLAN applications do not perform the critical operations, the WLAN applications may fail or enter an error state. Additionally, some WLAN applications may perform operations taking longer than the time period (e.g., one second) of antenna control at the WLAN circuitry. If the operation is not complete due to control of the antenna being taken away from the WLAN circuitry, the WLAN application may fail or enter an error state. Thus, the time division scheme may not be flexible enough to support at least some WLAN applications.

Examples of WLAN applications that may not be supported by the time division scheme include one or more applications performing preferred network offload (PNO) scans, out of service (OOS) scans, opportunistic roaming scans, "always-on" ranging scans, "locationing" scans or other scans having a time restriction, neighbor-aware network (NAN) discovery scans, NAN beaconing operations, and station-to-station multichannel concurrency (STA+STA MCC) operations. At least some of the operations (e.g., PNO scans, ranging scans, and locationing scans) may be performed in accordance with one or more standards.

To illustrate, applications performing the above-mentioned operations may access an antenna at various times outside the bounds of one second per each five second interval. As an example, applications supporting PNO perform scans may perform background scans for WLAN connections while the wireless device 102 is in a lower power (e.g., sleep) mode. The background scans may be performed in accordance with a standard and at times that are incompatible with the time division sharing scheme. As another example, applications supporting OOS scans may perform scans for WLAN connections when the wireless device 102 is out of service (e.g., out of a service range of wireless devices providing WLANs). The OOS scans may be performed at times that are incompatible with the time division sharing scheme. As another example, applications supporting opportunistic (e.g., smart) roaming may perform "split" scans via the 5 GHz channel when the wireless device 102 is not in an associated state with (e.g., connected to) any other wireless device via the 5 GHz channel. As another example, applications that support always-on ranging may perform ranging operations with APs operating in the 5 GHz channel when the wireless device 102 is not in an associated state with any other wireless device via the 5 GHz channel. As another example, applications supporting NAN discovery scans may perform scans for NAN beacons at a fixed periodicity that may be incompatible with the time division sharing scheme. As another example, applications supporting NAN beacon operations may send NAN beacons at a fixed periodicity that may be incompatible with the time division sharing scheme. As another example, applications supporting locationing scans (or other scans having a time restriction) may perform scans or ranging operations that have a duration exceeding one second, and thus may be incompatible with the time division sharing scheme. To illustrate, interrupting a scan that has a time restriction before completion (e.g., due to the WLAN circuitry 104 losing control of the at least one antenna 110) may trigger an error. As another example, applications supporting STA+STA MCC operations may send messages via the 5 GHz channel at a fixed periodicity that may be incompatible with the time division sharing scheme. Because the fixed periodicity of the above-described operations may be different, a single time division sharing scheme may not be compatible with each of the above-described applications. Thus, the time division sharing scheme does not support each of the above-described applications.

Instead of sharing the at least one antenna 110 using a time division scheme, the LTE circuitry 106 may be configured to share control of the at least one antenna 110 with the WLAN circuitry 104 based on messages exchanged between the WLAN circuitry 104 and the LTE circuitry 106. This method of sharing may be performed when the wireless device 102 is not in an associated state with any other wireless device via a WLAN and when the WLAN mode and the LTE mode are enabled. When the wireless device 102 is not in an associated state with any other wireless device via a WLAN (and when the WLAN mode and the LTE mode are enabled), the LTE circuitry 106 may be configured to have control of the at least one antenna 110 by default. When the WLAN circuitry 104 determines that an application is requesting access to the at least one antenna 110, the WLAN circuitry 104 may request control of the at least one antenna 110. To illustrate, the WLAN circuitry 104 may be configured to generate a request 130 when an application is requesting access to the at least one antenna 110. The request 130 may be sent via the interface 108. For example, the interface 108 may enable communication between the LTE circuitry 106 and the WLAN circuitry 104, and messages, such as the request 130 or a response to the request 130, may be transmitted or received via the interface 108. The LTE circuitry 106 may be configured to receive the request 130 from WLAN circuitry 104 and to send a response 140 based on data included in the request 130, as further described herein.

The request 130 may include data corresponding to an operation corresponding to the request. The data may include a criticality bit 132 indicating whether an operation corresponding to the request is critical. An operation may be referred to as "critical" if failure to perform the operation will cause an application to fail or enter an error state. A value of the criticality bit 132 may indicate whether the operation is critical. For example, if the criticality bit 132 has a first value, the operation is critical, and if the criticality bit 132 has a second value, the operation is not critical. In a particular implementation, the first value is a one value and the second value is a zero value. Alternatively, the first value may be a zero value and the second value may be a one value.

The request 130 may also indicate a duration 134 of the operation to be performed using the at least one antenna 110. The duration 134 may be a value representing an estimated duration of performing the operation corresponding to the request. In a particular implementation, the WLAN circuitry 104 may be configured to receive the duration 134 from an application requesting access to the at least one antenna 110. In another particular implementation, the WLAN circuitry 104 may be configured to access a memory (not shown) storing estimated durations corresponding to performance of various operations via the WLAN circuitry 104. The memory may be accessed based on a type of application requesting access to the at least one antenna 110. In another particular implementation, the WLAN circuitry 104 may include a processor or controller configured to estimate the duration 134 of performance of the operation.

The LTE circuitry 106 may be configured to send the response 140 to the WLAN circuitry 104 based on the data included in the request 130. The response 140 may indicate whether the request 130 is granted by the LTE circuitry 106. The response 140 may be sent based on the criticality bit 132, the duration 134, or a combination thereof.

The LTE circuitry 106 may be configured to automatically grant requests corresponding to critical operations. When the operation is critical, the LTE circuitry 106 may grant the request regardless of the duration 134. To illustrate, the LTE circuitry 106 may be configured to grant the request 130 when the criticality bit 132 has a first value indicating the request 130 corresponds to a critical operation. When the request 130 is being granted, the response 140 is an acknowledgement (ACK) message. For example, when the criticality bit 132 has the first value, the LTE circuitry 106 sends an ACK as the response 140 to indicate that the request 130 is being granted. In response to receiving the request 130 with the criticality bit 132 having the first value, the LTE circuitry 106 may "immediately" grant the request 130. "Immediately" granting the request refers to terminating any current operations being performed by the LTE circuitry 106, sending the ACK, and releasing control of the at least one antenna 110. Details regarding timing of messages sent when the criticality bit 132 has the first value are described further with reference to FIG. 2.

In addition to sending the ACK as the response 140, the LTE circuitry 106 releases control of the at least one antenna 110. In a particular implementation, releasing control of the at least one antenna 110 includes causing a switch to couple the at least one antenna 110 to the WLAN circuitry 104. For example, the wireless device 102 may include a switch that is configured to selectively couple the WLAN circuitry 104 or the LTE circuitry 106 to the at least one antenna 110. To release control of the at least one antenna 110, the LTE circuitry 106 may cause the switch to couple the WLAN circuitry 104 to the at least one antenna 110. In an alternate implementation, a processor or a controller included in the LTE circuitry 106 may be configured to stop sending or receiving data via the at least one antenna 110 in response to the LTE circuitry 106 releasing control of the at least one antenna 110. For example, the LTE circuitry 106 may disable data transmission from the LTE circuitry 106 to the at least one antenna 110 in response to release of control of the at least one antenna 110.

In response to receiving the ACK as the response 140, the WLAN circuitry 104 may take control of the at least one antenna 110 to perform the operation corresponding to the request 130. The WLAN circuitry 104 may maintain control of the at least one antenna 110 until performance of the operation is completed. Completing performance of the operation may be referred to as "atomically" completing the operation. After performance of the operation is complete, the WLAN circuitry 104 may send a release message 142 to the LTE circuitry 106 and may release control of the at least one antenna 110. The LTE circuitry 106 may be configured to receive the release message 142 and, in response to receiving the release message 142, to regain control of the at least one antenna 110. In a particular implementation, regaining (or maintaining) control of the at least one antenna 110 includes causing the switch to couple the at least one antenna 110 to the LTE circuitry 106. In an alternate implementation, a processor or a controller included in the LTE circuitry 106 may be configured to resume sending or receiving data via the at least one antenna 110 when the LTE circuitry 106 regains control of the at least one antenna 110.

In a particular implementation, the release message 142 is received prior to expiration of a time period corresponding to the duration 134 indicated by the data of the request 130. For example, the WLAN circuitry 104 may complete performance of the operation and send the release message 142 in less time than the duration 134. Because the WLAN circuitry 104 is configured to release control of the at least one antenna 110 when performance of the operation is complete instead of maintaining control until a certain time based on the duration 134, inactivity periods corresponding to the at least one antenna 110 may be reduced.

Additionally, the LTE circuitry 106 may be configured to selectively grant non-critical requests. Selective granting of requests may be based on the duration 134. To illustrate, when the criticality bit 132 has the second value indicating the request 130 does not correspond to a critical operation, the LTE circuitry 106 may be configured to determine whether to grant the request 130 based on the duration 134. Details regarding timing of messages sent when the criticality bit 132 has the second value are described further with reference to FIGS. 3-5. The LTE circuitry 106 may also be configured to determine an estimated duration of time before a next expected operation at the LTE circuitry 106 and to use the estimated duration in determining whether to grant the request 130. When the duration 134 fails to exceed the estimated duration, the request 130 may be granted. The request 130 may be granted in order to efficiently use a time period of inactivity at the at least one antenna 110 when the LTE circuitry 106 is not scheduled to send or receive data. To illustrate, the LTE circuitry 106 may determine to release control of that at least one antenna 110 in response to the duration 134 failing to exceed the estimated duration of time before a next expected operation at the LTE circuitry 106. In response to determining that the duration 134 fails to exceed the estimated duration, the LTE circuitry 106 sends an ACK as the response 140 and the LTE circuitry 106 releases control of the at least one antenna 110. The WLAN circuitry 104 may receive the response 140 (e.g., the ACK) and may maintain control of the at least one antenna 110 until performance of the operation is complete. After completing performance of the operation, the WLAN circuitry 104 may send the release message 142 and may release control of the at least one antenna 110.

If the duration 134 is equal to or exceeds the estimated duration, the request 130 is not granted because the LTE circuitry 106 is scheduled to send or receive data before the operation at the WLAN circuitry 104 would be complete. The LTE circuitry 106 may determine not to release control of that at least one antenna 110 in response to the duration 134 being equal to or exceeding the estimated duration of time before a next expected operation at the LTE circuitry 106. In response to determining that the estimated duration is equal to or exceeds the duration 134, the LTE circuitry 106 sends a NACK as the response 140. The WLAN circuitry 104 may be configured to receive the response 140 (e.g., the NACK) and to determine that control of that at least one antenna 110 has not been released based on the NACK. In response to receiving the NACK, the WLAN circuitry 104 may send a second request to the LTE circuitry 106 to request control of that at least one antenna 110. In the second request, the criticality bit 132 may have the first value, as further described with reference to FIG. 4. Alternatively, in the second request the criticality bit 132 may have the second value, and the LTE circuitry 106 may determine not to grant the second request, as further described with reference to FIG. 5. In some implementations, failure to grant the second request may cause an error condition at the WLAN circuitry 104.

In a particular implementation, the request 130 may indicate a periodicity corresponding to the request 130. For example, the request 130 may include a count value 136 corresponding to the periodicity of requested access to the at least one antenna 110 by the WLAN circuitry 104. Additional details of the timing of messages sent in this implementation are further described with reference to FIG. 6. In this implementation, the WLAN circuitry 104 may identify an operation that is to be performed on a periodic basis, and the request 130 may be based on the operation. The request 130 may also include the criticality bit 132 having the first value (indicating that the request 130 corresponds to a critical operation). The LTE circuitry 106 may be configured to grant the request 130 on a periodic basis according to the count value 136. The LTE circuitry 106 may include a timer used to identify times when the request 130 is to be granted. In addition to releasing control of the at least one antenna 110 in response to receiving the request 130 with the count value 136, the LTE circuitry 106 may start the timer at an initial value. Releasing control of the at least one antenna 110 may include sending an ACK as the response 140. After the WLAN circuitry 104 completes performance of the operation, the WLAN circuitry 104 sends the release message 142 to the LTE circuitry 106. After receiving the release message 142, the LTE circuitry 106 may regain control of the at least one antenna 110.

However, the WLAN circuitry 104 is scheduled to perform the operation again at a later time indicated by the count value 136. The LTE circuitry 106 may be configured to use the timer to release control of the at least one antenna 110 without receiving additional request messages from the WLAN circuitry 104. To illustrate, the LTE circuitry 106 may be configured to release control of the at least one antenna 110 when the timer reaches a value that matches the count value 136. In some implementations, the LTE circuitry 106 may send another ACK to indicate release of the at least one antenna 110. In other implementations, the LTE circuitry 106 may release the at least one antenna without sending an ACK. After releasing control of the at least one antenna 110, the LTE circuitry 106 may reset the timer. By resetting the timer each time control of the at least one antenna 110 is released, the LTE circuitry 106 may be configured to periodically grant the request 130 based on a single request (e.g., without receiving a request from the WLAN circuitry 104 each time control of the at least one antenna 110 is requested). If the operation no longer is scheduled to be performed, the WLAN circuitry 104 may send a termination message 144 to the LTE circuitry 106. The LTE circuitry 106 may be configured to terminate operation of the timer (and to stop periodically releasing control of the at least one antenna 110) in response to receiving the termination message 144. Periodically releasing control of the at least one antenna 110 at the LTE circuitry 106 based on a single request message reduces overhead and congestion at the interface 108 by reducing an amount of messages exchanged between the WLAN circuitry 104 and the LTE circuitry 106 to support a periodic operation at the WLAN circuitry 104.

During operation, the LTE circuitry 106 may have control of the at least one antenna 110 when both a WLAN mode and an LTE mode of the wireless device 102 are enabled and when the wireless device 102 is not in an associated state with any other wireless device, such as the AP 120, via a WLAN. When the LTE circuitry 106 has control of the at least one antenna 110, the LTE circuitry 106 may use the at least one antenna 110 to send or receive data via an LTE network provided by the base station 122. In a particular implementation, the LTE network is an LTE-U network. The WLAN circuitry 104 may determine that an application is requesting control of the at least one antenna 110 and the WLAN circuitry 104 may send a request 130 to the LTE circuitry 106. The request 130 includes the criticality bit 132 and indicates the duration 134. In response to receiving the request 130, the LTE circuitry 106 may determine whether to grant the request 130 based on data (e.g., the criticality bit 132 and the duration 134) included in the request 130. If the criticality bit 132 has a first value indicating the request 130 corresponds to a critical operation, the LTE circuitry 106 may grant the request 130 by sending an ACK as a response 140 to the WLAN circuitry 104 and by releasing control of the at least one antenna 110. After receiving the response 140, the WLAN circuitry 104 may perform the operation using the at least one antenna 110. For example, the WLAN circuitry 104 may use the at least one antenna 110 to perform an operation via a WLAN provided by the AP 120. After completion of the operation, the WLAN circuitry 104 may release control of the at least one antenna 110 and may indicate release of the at least one antenna 110 by sending a release message 142 to the LTE circuitry 106.

If the criticality bit 132 has a second value indicating the request 130 does not correspond to a critical operation, the LTE circuitry 106 may determine whether to grant the request 130 based on the duration 134. For example, if the duration 134 fails to exceed an estimated duration of time before a next expected operation at the LTE circuitry 106, the LTE circuitry 106 may grant the request 130 by sending an ACK as a response 140 to the WLAN circuitry 104 and by releasing control of the at least one antenna 110. The WLAN circuitry 104 may perform the operation and then release control of the at least one antenna 110 and send the release message 142 to the LTE circuitry 106. Alternatively, if the duration 134 is equal to or exceeds the estimated duration of time before a next expected operation at the LTE circuitry 106, the LTE circuitry 106 may not grant the request 130 and may send a NACK as a response 140 to the WLAN circuitry 104. In response to the NACK, the WLAN circuitry 104 may send a second request for control of the at least one antenna 110. If the second request is not granted, an error may be triggered at the WLAN circuitry 104.

The system 100 may enable sharing of at least one antenna 110 between the WLAN circuitry 104 and the LTE circuitry 106 with more flexibility than using a time division scheme. For example, the WLAN circuitry 104 may be able to request control of the at least one antenna 110 when a critical operation is scheduled to be performed, as compared to waiting for a designated time (e.g., one second of each five second interval) in the time division scheme. Because the LTE circuitry 106 is configured to grant requests corresponding to critical operations, critical operations may be performed via the WLAN circuitry 104 when the operations are scheduled, thus preventing failure of a WLAN application. Additionally, requests that correspond to non-critical requests can be granted during periods of inactivity at the LTE circuitry 106. In this manner, the at least one antenna 110 may be efficiently shared between the WLAN circuitry 104 and the LTE circuitry 106 while also supporting WLAN applications with critical operations. Because the WLAN circuitry 104 and the LTE circuitry 106 may each be configured to send and receive data via a 5 GHz channel, the sharing scheme may reduce coexistence issues between the WLAN circuitry 104 and the LTE circuitry 106, and the wireless device 102 may support more WLAN operations than wireless devices that share an antenna between WLAN operations and LTE operations using a time division scheme.

Figure 2:
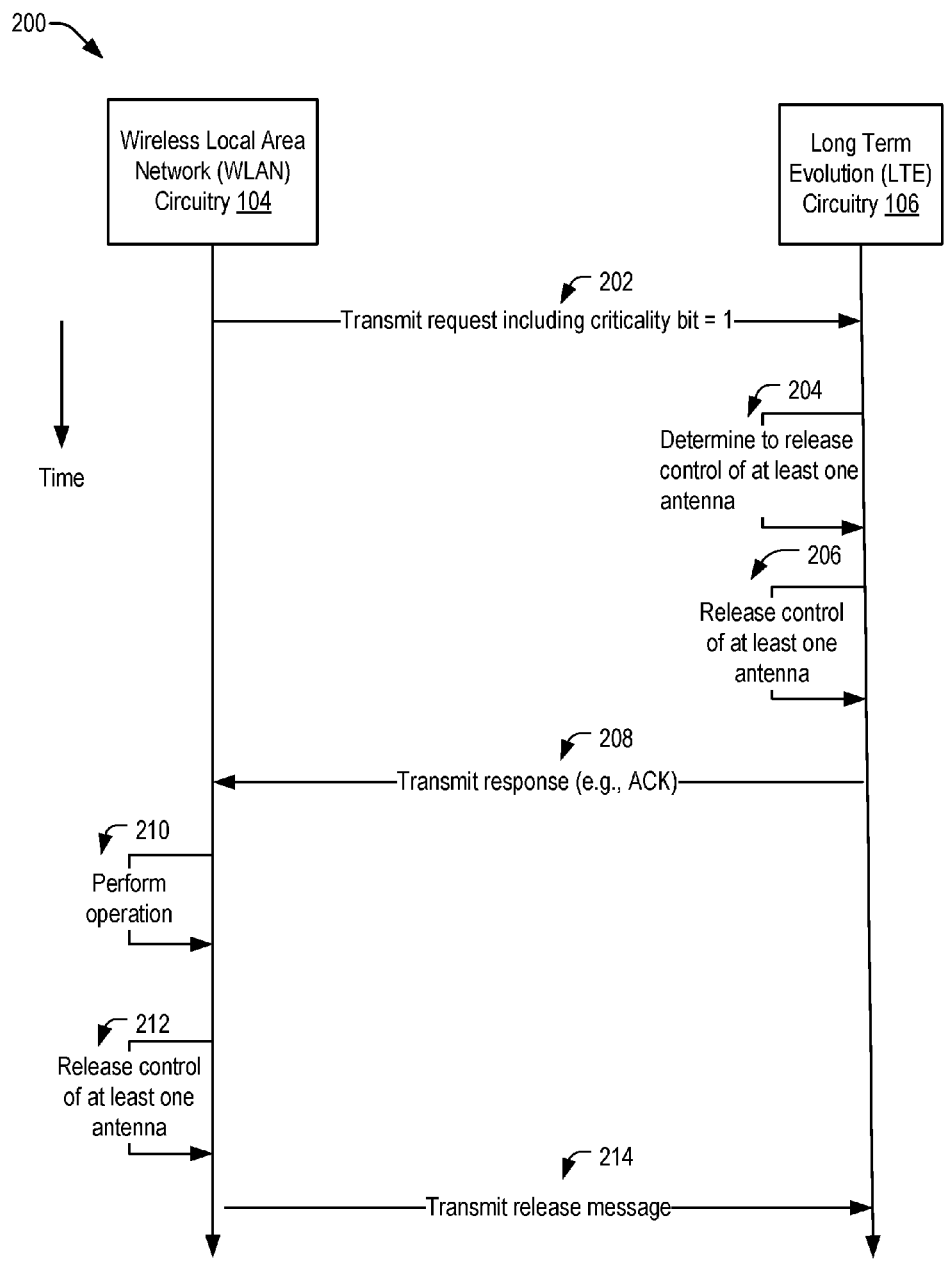
FIG. 2 is a ladder diagram of a first aspect of a method of sharing at least one antenna between WLAN circuitry and LTE circuitry.

Referring to FIG. 2, a ladder diagram of a first aspect of a method 200 of sharing at least one antenna between WLAN circuitry and LTE circuitry is shown. The method 200 may be performed by a wireless device that includes WLAN circuitry and LTE circuitry that are configured to share at least one antenna. In a particular implementation, the method 200 is performed by the wireless device 102 including the WLAN circuitry 104 and the LTE circuitry 106 of FIG. 1.

To begin, the LTE circuitry 106 may have control of the at least one antenna 110 and may send or receive data via an LTE network using the at least one antenna 110. For example, the LTE circuitry 106 may send or receive data via an LTE-U network provided by the base station 122 of FIG. 1. When the WLAN circuitry 104 determines that an operation that accesses the at least one antenna 110 is scheduled for performance, the WLAN circuitry 104 transmits (e.g., sends) a request, such as the request 130, to the LTE circuitry 106, at 202. The request 130 includes the criticality bit 132, and the criticality bit 132 has a first value indicating that the request 130 corresponds to a critical operation. For example, the criticality bit 132 may be equal to one when the request 130 corresponds to a critical operation. In other implementations, the criticality bit 132 may have a different value to indicate that the request 130 corresponds to a critical operation. As explained with reference to FIG. 1, an operation may be referred to as "critical" if failure to perform the operation will cause an application to fail or enter an error state.

In response to receiving the request 130 having the criticality bit 132, the LTE circuitry 106 may determine to release control of the at least one antenna 110, at 204. For example, the LTE circuitry 106 may determine to release control of the at least one antenna 110 based on the criticality bit 132 having the first value (indicating the request 130 corresponds to a critical request). Determining to release control of that at least one antenna 110 may correspond to granting the request 130. The LTE circuitry 106 may be configured to automatically grant requests that are indicated as critical. In response to receiving a request that is indicated as critical, the LTE circuitry 106 may begin performing operations to release control of the at least one antenna 110.

The LTE circuitry 106 releases control of the at least one antenna 110, at 206. As one example, the LTE circuitry 106 may configure a switch to couple the at least one antenna 110 to the WLAN circuitry 104 (and not to the LTE circuitry 106). As another example, a processor or a controller included in the LTE circuitry 106 may refrain from (e.g., prevent an application associated with the LTE circuitry 106 from) sending or receiving data via the at least one antenna 110 when control of the at least one antenna 110 is released. To indicate granting of the request 130, the LTE circuitry 106 transmits a response 140 to the WLAN circuitry 104, at 208. Although step 206 is described as occurring prior to step 208, in other implementations, step 206 may be performed concurrently with step 208, or step 208 may be performed prior to step 206. In FIG. 2, the response 140 is an acknowledgement (ACK). The ACK indicates to the WLAN circuitry 104 that the request 130 has been granted by the LTE circuitry 106.

The WLAN circuitry 104 may use the at least one antenna 110 to perform the operation, at 210. For example, the WLAN circuitry 104 may perform a scanning operation, a ranging operation, a NAN discovery or beaconing operation, or another operation (as described with reference to FIG. 1) by sending or receiving data via a WLAN (e.g., a WLAN provided by the AP 120) using the at least one antenna 110. The operation may be performed even though the wireless device 102 is not in an associated state with any other wireless device via the WLAN. For example, the WLAN circuitry 104 may monitor the 5 GHz channel for a message or may broadcast a message via the 5 GHz channel in an attempt to find a wireless device to associate with. After performance of the operation is complete (e.g., "atomically complete"), the WLAN circuitry 104 may release control of the at least one antenna 110, at 212. Additionally, the WLAN circuitry 104 may transmit a release message 142 to the LTE circuitry 106, at 214. As one example, the WLAN circuitry 104 may configure a switch to couple the at least one antenna 110 to the LTE circuitry 106 (and not to the WLAN circuitry 104). As another example, a processor or a controller included in the WLAN circuitry 104 may refrain from sending or receiving data via the at least one antenna 110 when control of the at least one antenna 110 is released. After receiving the release message 142, the LTE circuitry 106 may send or receive data via an LTE network, such as the LTE-U network provided by the base station 122 of FIG. 1. Although step 212 is described as occurring prior to step 214, in other implementations, step 212 may be performed concurrently with step 214, or step 214 may be performed prior to step 212.

Figure 3:
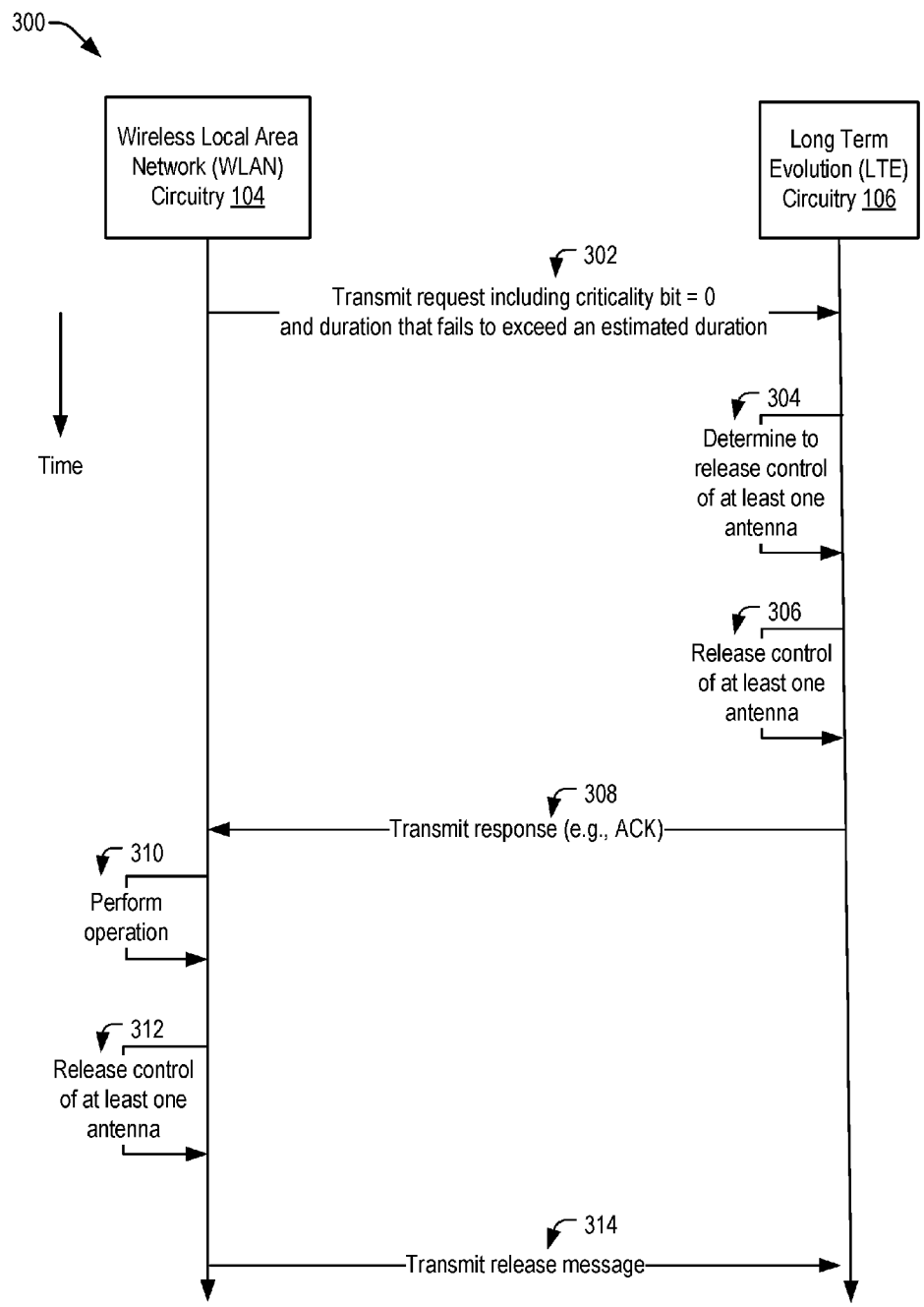
FIG. 3 is a ladder diagram of a second aspect of a method of sharing at least one antenna between WLAN circuitry and LTE circuitry.

Referring to FIG. 3, a ladder diagram of a second aspect of a method 300 of sharing at least one antenna between WLAN circuitry and LTE circuitry is shown. The method 300 may be performed by a wireless device that includes WLAN circuitry and LTE circuitry that are configured to share at least one antenna. In a particular implementation, the method 300 is performed by the wireless device 102 including the WLAN circuitry 104 and the LTE circuitry 106 of FIG. 1.

To begin, the LTE circuitry 106 may have control of the at least one antenna 110 and may send or receive data via an LTE network using the at least one antenna 110. For example, the LTE circuitry 106 may send or receive data via an LTE-U network provided by the base station 122 of FIG. 1. When the WLAN circuitry 104 determines that an operation that accesses the at least one antenna 110 is scheduled for performance, the WLAN circuitry 104 transmits a request, such as the request 130, to the LTE circuitry 106, at 302. The request 130 includes the criticality bit 132 and indicates the duration 134. The duration 134 indicates an estimated duration of time that the operation corresponding to the request 130 will take to perform to completion. In FIG. 3, the criticality bit 132 has a second value indicating that the request 130 does not correspond to a critical operation. For example, the criticality bit 132 may be equal to zero when the request 130 does not correspond to a critical operation. In other implementations, the criticality bit 132 may have a different value to indicate that the request 130 does not correspond to a critical operation.

In response to receiving the request 130 having the criticality bit 132, the LTE circuitry 106 may determine whether to grant the request 130. For example, the LTE circuitry 106 may determine whether to grant the request 130 based on the duration 134. The LTE circuitry 106 may determine to grant the request 130 when the duration 134 fails to exceed an estimated duration until a next operation scheduled at the LTE circuitry 106. The LTE circuitry 106 may be configured to grant requests from the WLAN circuitry 104 that can be completed during a period of inactivity (e.g., prior to a next scheduled operation) at the LTE circuitry 106. In the example illustrated in FIG. 3, the duration 134 fails to exceed the estimated duration. Thus, the LTE circuitry 106 determines to grant the request 130, at 304. The LTE circuitry 106 releases control of the at least one antenna 110, at 306. To indicate granting of the request 130, the LTE circuitry 106 transmits a response 140 to the WLAN circuitry 104, at 308. In FIG. 3, the response 140 is an ACK. The ACK indicates to the WLAN circuitry 104 that the request 130 has been granted by the LTE circuitry 106. Although step 306 is described as occurring prior to step 308, in other implementations, step 306 may be performed concurrently with step 308, or step 308 may be performed prior to step 306.

The WLAN circuitry 104 may use the at least one antenna 110 to perform the operation, at 310. For example, the WLAN circuitry 104 may perform one of the operations described with reference to FIG. 1 by sending or receiving data via a WLAN (e.g., a WLAN provided by the AP 120) using the at least one antenna 110. The operation may be performed even though the wireless device 102 is not in an associated state with any other wireless device via the WLAN. After performance of the operation is complete, the WLAN circuitry 104 may release control of the at least one antenna 110, at 312. Additionally, the WLAN circuitry 104 may transmit a release message 142 to the LTE circuitry 106, at 314. After receiving the release message 142, the LTE circuitry 106 may send or receive data via an LTE network, such as the LTE-U network provided by the base station 122 of FIG. 1. Although step 312 is described as occurring prior to step 314, in other implementations, step 312 may be performed concurrently with step 314, or step 314 may be performed prior to step 312.

Figure 4:
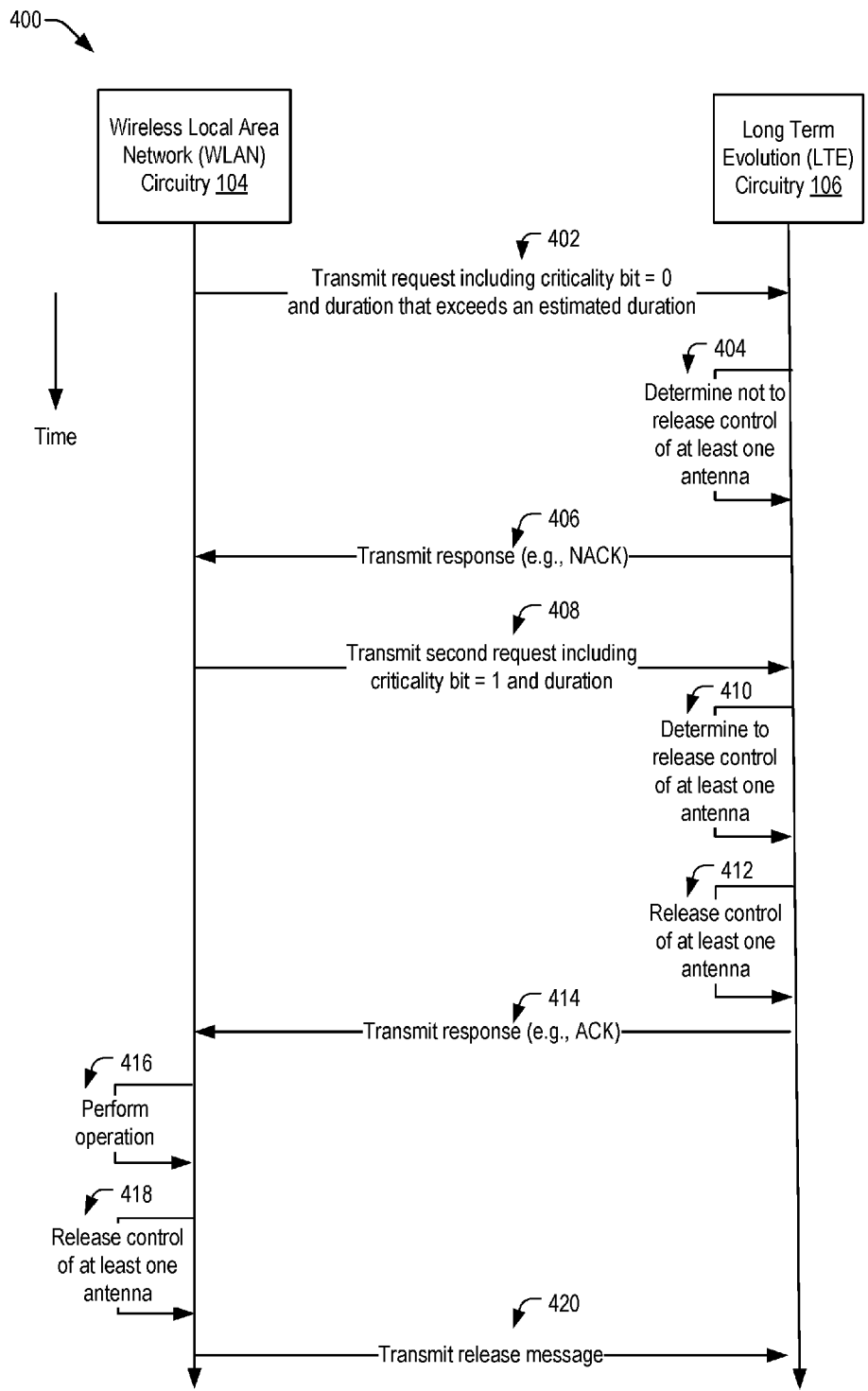
FIG. 4 is a ladder diagram of a third aspect of a method of sharing at least one antenna between WLAN circuitry and LTE circuitry.

Referring to FIG. 4, a ladder diagram of a third aspect of a method 400 of sharing at least one antenna between WLAN circuitry and LTE circuitry is shown. The method 400 may be performed by a wireless device that includes WLAN circuitry and LTE circuitry that are configured to share at least one antenna. In a particular implementation, the method 400 is performed by the wireless device 102 including the WLAN circuitry 104 and the LTE circuitry 106 of FIG. 1.

To begin, the LTE circuitry 106 may have control of the at least one antenna 110 and may send or receive data via an LTE network using the at least one antenna 110. For example, the LTE circuitry 106 may send or receive data via an LTE-U network provided by the base station 122 of FIG. 1. When the WLAN circuitry 104 determines that an operation that accesses the at least one antenna 110 is scheduled for performance, the WLAN circuitry 104 transmits a request, such as the request 130, to the LTE circuitry 106, at 402. The request 130 includes the criticality bit 132 and indicates the duration 134. The duration 134 indicates an estimated duration of time that the operation corresponding to the request 130 will take to perform to completion. In FIG. 4, the criticality bit 132 has a second value indicating that the request 130 does not correspond to a critical operation. For example, the criticality bit 132 may be equal to zero when the request 130 does not correspond to a critical operation. In other implementations, the criticality bit 132 may have a different value to indicate that the request 130 does not correspond to a critical operation.

In response to receiving the request 130 having the criticality bit 132, the LTE circuitry 106 may determine whether to grant the request 130. For example, the LTE circuitry 106 may determine whether to grant the request 130 based on the duration 134. The LTE circuitry 106 may determine not to grant the request 130 when the duration 134 is equal to or exceeds an estimated duration until a next operation scheduled at the LTE circuitry 106. The LTE circuitry 106 may be configured not to grant requests from the WLAN circuitry 104 that cannot be completed during a period of inactivity (e.g., prior to a next scheduled operation) at the LTE circuitry 106. In the example illustrated in FIG. 4, the duration 134 is equal to or exceeds the estimated duration. Thus, the LTE circuitry 106 determines not to grant the request 130, at 404. To indicate the request 130 is not being granted, the LTE circuitry 106 transmits a response 140 to the WLAN circuitry 104, at 406. In FIG. 4, the response 140 is a negative acknowledgement (NACK). The NACK indicates to the WLAN circuitry 104 that the request 130 has not been granted by the LTE circuitry 106. After transmitting the NACK, the LTE circuitry 106 maintains control of the at least one antenna 110.

In response to receiving the NACK, the WLAN circuitry 104 may determine to generate another request for access to the at least one antenna 110. For example, the WLAN circuitry 104 may transmit a second request to the LTE circuitry 106, at 408. The second request indicates the duration 134 in the same manner as the request 130. Additionally, the criticality bit 132 included in the second request has the first value (indicating the second request corresponds to a critical operation). By changing the value of the criticality bit 132 in the second request as compared to the request 130, the WLAN circuitry 104 may ensure that the LTE circuitry 106 grants the second request. In response to receiving the second request, the LTE circuitry 106 may determine to grant the second request, at 410. For example, the LTE circuitry 106 may determine to grant the second response based on the criticality bit 132 of the second request having the first value. After determining to grant the second request, the LTE circuitry 106 may release control of that at least one antenna 110, at 412. Additionally, the LTE circuitry 106 may transmit a second response to the WLAN circuitry 104, at 414. The second response may include or correspond to an ACK. Although step 412 is described as occurring prior to step 414, in other implementations, step 412 may be performed concurrently with step 414, or step 414 may be performed prior to step 412.

The WLAN circuitry 104 may use the at least one antenna 110 to perform the operation, at 416. For example, the WLAN circuitry 104 may perform one of the operations described with reference to FIG. 1 by sending or receiving data via a WLAN (e.g., a WLAN provided by the AP 120) using the at least one antenna 110. The operation may be performed even though the wireless device 102 is not in an associated state with any other wireless device via the WLAN. After performance of the operation is complete, the WLAN circuitry 104 may release control of the at least one antenna 110, at 418. Additionally, the WLAN circuitry 104 may transmit a release message 142 to the LTE circuitry 106, at 420. Although step 418 is described as occurring prior to step 420, in other implementations, step 418 may be performed concurrently with step 420, or step 420 may be performed prior to step 418. After receiving the release message 142, the LTE circuitry 106 may send or receive data via an LTE network, such as the LTE-U network provided by the base station 122 of FIG. 1.

Figure 5:
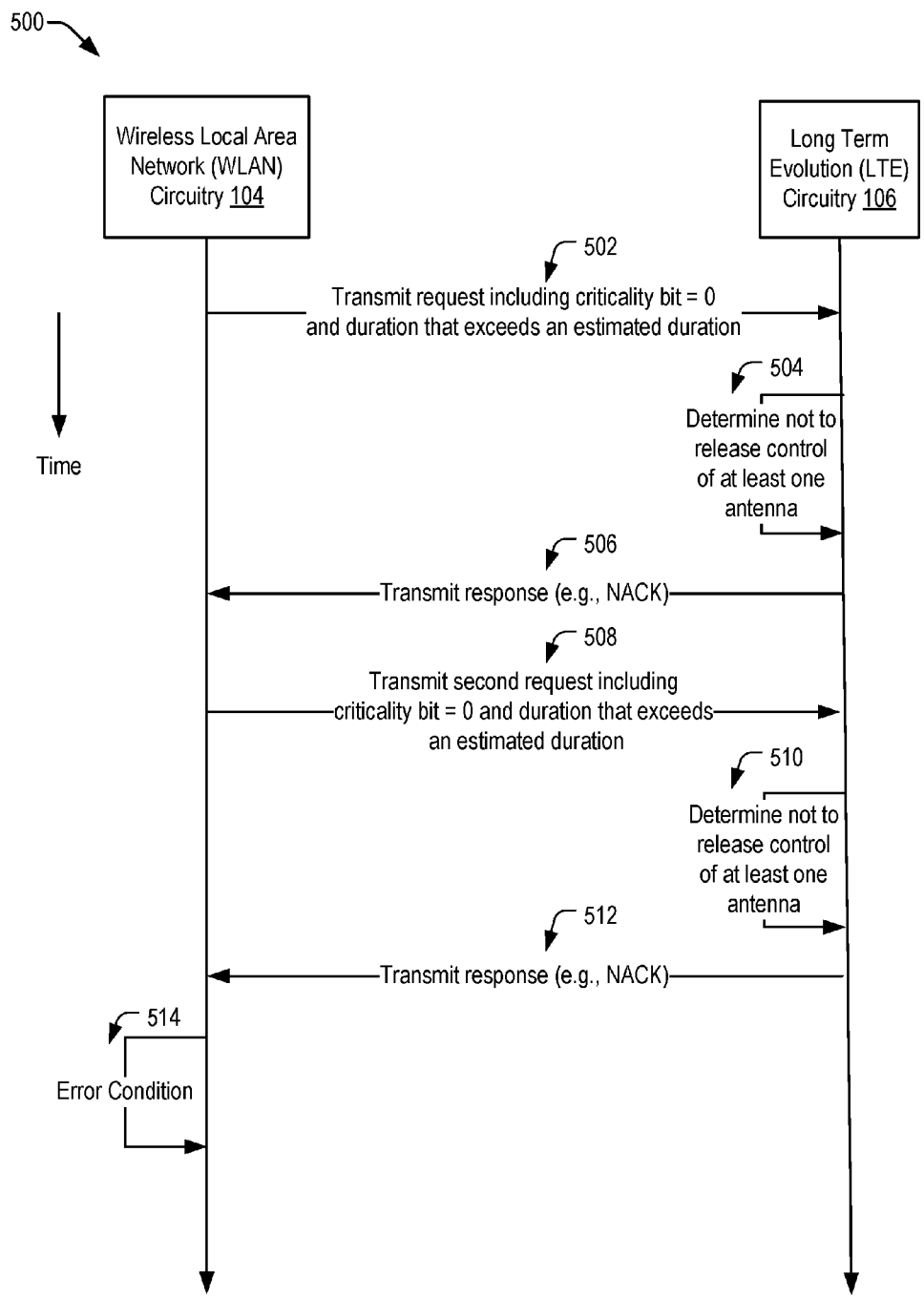
FIG. 5 is a ladder diagram of a fourth aspect of a method of sharing at least one antenna between WLAN circuitry and LTE circuitry.

Referring to FIG. 5, a ladder diagram of a fourth aspect of a method 500 of sharing at least one antenna between WLAN circuitry and LTE circuitry is shown. The method 500 may be performed by a wireless device that includes WLAN circuitry and LTE circuitry that are configured to share at least one antenna. In a particular implementation, the method 500 is performed by the wireless device 102 including the WLAN circuitry 104 and the LTE circuitry 106 of FIG. 1.

To begin, the LTE circuitry 106 may have control of the at least one antenna 110 and may send or receive data via an LTE network using the at least one antenna 110. For example, the LTE circuitry 106 may send or receive data via an LTE-U network provided by the base station 122 of FIG. 1. When the WLAN circuitry 104 determines that an operation that accesses the at least one antenna 110 is scheduled for performance, the WLAN circuitry 104 transmits a request, such as the request 130, to the LTE circuitry 106, at 502. The request 130 includes the criticality bit 132 and indicates the duration 134. The duration 134 indicates an estimated duration of time that the operation corresponding to the request 130 will take to perform to completion. In FIG. 5, the criticality bit 132 has a second value indicating that the request 130 does not correspond to a critical operation. For example, the criticality bit 132 may be equal to zero when the request 130 does not correspond to a critical operation. In other implementations, the criticality bit 132 may have a different value to indicate that the request 130 does not correspond to a critical operation.

In response to receiving the request 130 having the criticality bit 132, the LTE circuitry 106 may determine whether to grant the request 130. For example, the LTE circuitry 106 may determine whether to grant the request 130 based on the duration 134. The LTE circuitry 106 may determine not to grant the request 130 when the duration 134 is equal to or exceeds an estimated duration until a next operation scheduled at the LTE circuitry 106. The LTE circuitry 106 may be configured not to grant requests from the WLAN circuitry 104 that cannot be completed during a period of inactivity (e.g., prior to a next scheduled operation) at the LTE circuitry 106. In the example illustrated in FIG. 5, the duration 134 is equal to or exceeds the estimated duration. Thus, the LTE circuitry 106 determines not to grant the request 130, at 504. To indicate the request 130 is not being granted, the LTE circuitry 106 transmits a response 140 to the WLAN circuitry 104, at 506. In FIG. 4, the response 140 is a negative acknowledgement (NACK). The NACK indicates to the WLAN circuitry 104 that the request 130 has not been granted by the LTE circuitry 106. After transmitting the NACK, the LTE circuitry 106 maintains control of the at least one antenna 110.

In response to receiving the NACK, the WLAN circuitry 104 may determine to generate another request for access to the at least one antenna 110. For example, the WLAN circuitry 104 may transmit a second request to the LTE circuitry 106, at 508. The second request indicates the duration 134 in the same manner as the request 130. In contrast to FIG. 4, in the example illustrated in FIG. 5, the criticality bit 132 included in the second request has the second value (indicating the second request does not correspond to a critical operation). Because the criticality bit 132 of the second request has the second value, the second request is not guaranteed to be granted by the LTE circuitry 106. In response to receiving the second request, the LTE circuitry 106 may determine not to grant the second request, at 510. For example, the LTE circuitry 106 may determine not to grant the second response when the duration 134 is equal to or exceeds an estimated duration until a next scheduled operation at the LTE circuitry 106. After determining not to grant the second request, the LTE circuitry 106 may transmit a second response to the WLAN circuitry 104, at 512. The second response may include or correspond to a NACK. The WLAN circuitry 104 may receive the NACK and generate an error condition (or enter an error state), at 514. Generating the error condition (or entering the error state) may indicate that an application is requesting to perform a non-critical operation that has a duration that is longer than an inactivity period at the LTE circuitry 106. Error recovery operations may be performed, such as performing a shorter operation, changing a criticality of the operation, or other operations.

Figure 6:
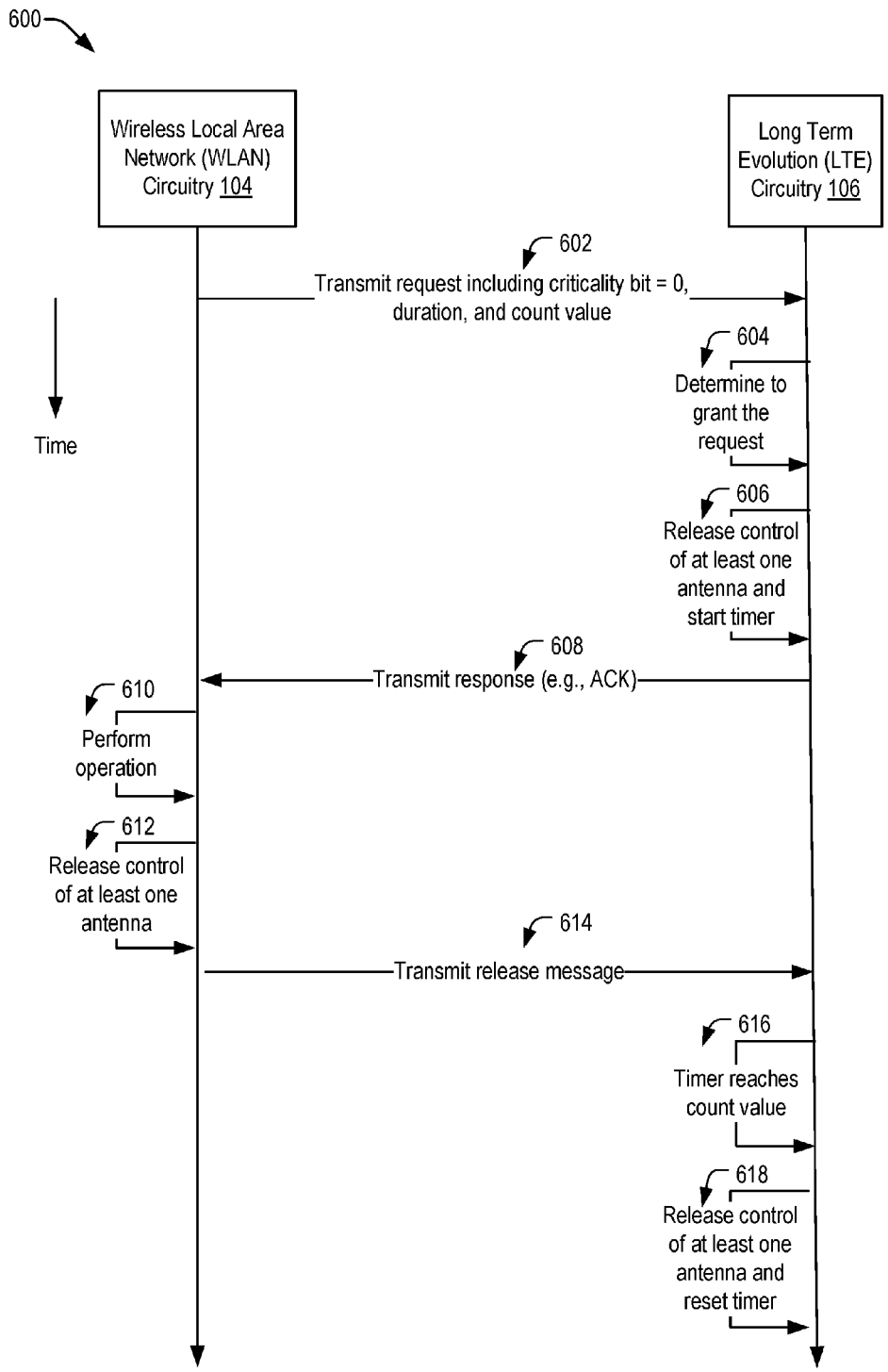
FIG. 6 is a ladder diagram of a fifth aspect of a method of sharing at least one antenna between WLAN circuitry and LTE circuitry.

Referring to FIG. 6, a ladder diagram of a fifth aspect of a method 600 of sharing at least one antenna between WLAN circuitry and LTE circuitry is shown. The method 600 may be performed by a wireless device that includes WLAN circuitry and LTE circuitry that are configured to share at least one antenna. In a particular implementation, the method 600 is performed by the wireless device 102 including the WLAN circuitry 104 and the LTE circuitry 106 of FIG. 1.

To begin, the LTE circuitry 106 may have control of the at least one antenna 110 and may send or receive data via an LTE network using the at least one antenna 110. For example, the LTE circuitry 106 may send or receive data via an LTE-U network provided by the base station 122 of FIG. 1. When the WLAN circuitry 104 determines that an operation that accesses the at least one antenna 110 is scheduled for periodic performance, the WLAN circuitry 104 transmits a request, such as the request 130, to the LTE circuitry 106, at 602. The request 130 includes the criticality bit 132, the duration 134, and the count value 136. The criticality bit 132 has a first value indicating that the request 130 corresponds to a critical operation. For example, the criticality bit 132 may be equal to one when the request 130 corresponds to a critical operation. In other implementations, the criticality bit 132 may have a different value to indicate that the request 130 corresponds to a critical operation. The duration 134 indicates an estimated duration of time that the operation corresponding to the request 130 will take to perform to completion. The count value 136 indicates a periodicity of performance of the operation. For example, the count value 136 may indicate an amount of time until control of the at least one antenna 110 is to be released to enable each performance of the operation.

In response to receiving the request 130 including the criticality bit 132 having the first value, the LTE circuitry 106 may determine to grant the request 130, at 604. For example, the LTE circuitry 106 may determine to grant the request 130 based on the criticality bit 132 having the first value (indicating the request 130 corresponds to a critical request). Additionally, the LTE circuitry 106 releases control of the at least one antenna 110 and start a timer, at 606. The timer may be started to enable periodic release of control of the at least one antenna 110 based on the count value 136. To indicate granting of the request 130, the LTE circuitry 106 transmits a response 140 to the WLAN circuitry 104, at 608. In FIG. 6, the response 140 is an acknowledgement (ACK). The ACK indicates to the WLAN circuitry 104 that the request 130 has been granted by the LTE circuitry 106. Although step 606 is described as occurring prior to step 608, in other implementations, step 606 may be performed concurrently with step 608, or step 608 may be performed prior to step 606.

The WLAN circuitry 104 may use the at least one antenna 110 to perform the operation, at 610. For example, the WLAN circuitry 104 may perform one of the operations described with reference to FIG. 1 by sending or receiving data via a WLAN (e.g., a WLAN provided by the AP 120) using the at least one antenna 110. The operation may be performed even though the wireless device 102 is not in an associated state with any other wireless device via the WLAN. After performance of the operation is complete, the WLAN circuitry 104 may release control of the at least one antenna 110, at 612. Additionally, the WLAN circuitry 104 may transmit a release message 142 to the LTE circuitry 106, at 614. Although step 612 is described as occurring prior to step 614, in other implementations, step 612 may be performed concurrently with step 614, or step 614 may be performed prior to step 612. After receiving the release message 142, the LTE circuitry 106 may send or receive data via an LTE network, such as the LTE-U network provided by the base station 122 of FIG. 1.

The timer may reach the count value 136, at 616. For example, a value of the timer may be equal to the count value 136. In response to the timer reaching the count value 136, the LTE circuitry 106 may release control of the at least one antenna 110, at 618. Additionally, the LTE circuitry 106 may reset the timer, at 618. In a particular implementation, the LTE circuitry 106 does not transmit an ACK when control of the at least one antenna 110 is released to reduce an amount of messages exchanged between the WLAN circuitry 104 and the LTE circuitry 106. In an alternate implementation, the LTE circuitry 106 transmits an ACK to the WLAN circuitry 104 prior to releasing control of the at least one antenna 110. The WLAN circuitry 104 may perform the operation (e.g., another iteration of the operation) and, after performance of the operation is complete, the WLAN circuitry 104 may release control of the at least one antenna 110. The LTE circuitry 106 may continue to periodically release control of the at least one antenna 110 based on the request 130 until a termination message 144 is received from the WLAN circuitry 104. In response to receiving the termination message 144, the LTE circuitry 106 may terminate operation of the timer, thus terminating the periodic release of control of the at least one antenna 110.

Figure 7:
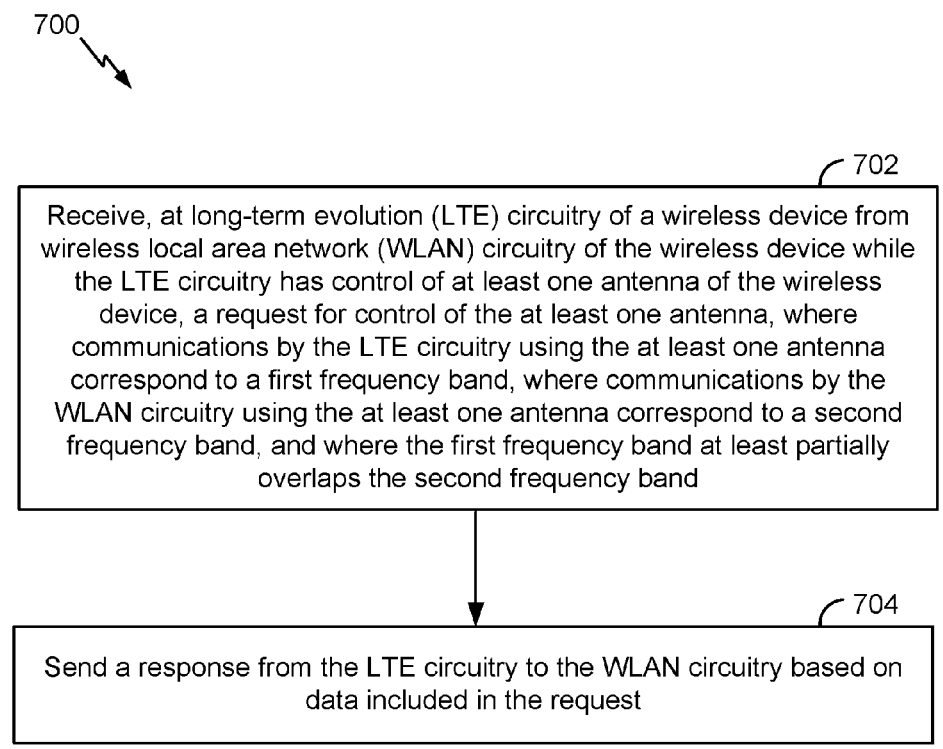
FIG. 7 is a flow chart illustrating a method of wireless communication in which at least one antenna is shared between WLAN circuitry and LTE circuitry.

Referring to FIG. 7, a flow chart illustrating a method 700 of wireless communication in which at least one antenna is shared between WLAN circuitry and LTE circuitry. The method 700 may be performed by a wireless device that includes WLAN circuitry, LTE circuitry and at least one antenna. In a particular implementation, the method 700 is performed by the LTE circuitry 106 of the wireless device 102 of FIG. 1.

The method 700 includes receiving, at long-term evolution (LTE) circuitry of a wireless device from wireless local area network (WLAN) circuitry of the wireless device while the LTE circuitry has control of at least one antenna of the wireless device, a request for control of the at least one antenna, at 702. Communications by the LTE circuitry using the at least one antenna may correspond to a first frequency band, communications by the WLAN circuitry using the at least one antenna may correspond to a second frequency band, and the first frequency band may at least partially overlap the second frequency band. For example, with reference to FIG. 1, the LTE circuitry 106 may receive the request 130 from the WLAN circuitry 104 while the LTE circuitry 106 has control of the at least one antenna 110. The LTE circuitry 106 may communicate via the first frequency band (e.g., one or more sub-bands within a frequency band referred to as the "5 GHz unlicensed spectrum", which may include frequencies between approximately 5 GHz and approximately 6 GHz, such as 5150 megahertz (MHz) to 5850 MHz). For example, the LTE circuitry 106 may include LTE-Unlicensed (LTE-U) circuitry configured to perform wireless communications via one or more LTE-U sub bands. The WLAN circuitry 104 may perform wireless communication via the second frequency band (e.g., the 5 GHz channel), which at least partially overlaps the first frequency band. In another implementation, the first frequency band and the second frequency band do not overlap.

The method 700 includes sending a response from the LTE circuitry to the WLAN circuitry based on data included in the request, at 702. For example, with reference to FIG. 1, the LTE circuitry 106 may send the response 140 to the WLAN circuitry 104 based on data included in the request 130.

In a particular implementation, the method 700 may include sending data transmissions, receiving data transmissions, or a combination thereof, via the at least one antenna in response to the LTE circuitry having control of the at least one antenna. The method 700 also includes refraining from sending and receiving data transmissions via the at least one antenna in response to the WLAN circuitry having control of the at least one antenna. For example, in response to the LTE circuitry 106 having control of the at least one antenna 110, the LTE circuitry 106 may send data transmissions to an LTE network and/or receive data transmissions from an LTE network using the at least one antenna 110. In response to the WLAN circuitry 104 having control of the at least one antenna 110, the LTE circuitry 106 may refrain from sending and receiving data transmissions via the at least one antenna 110. In a particular implementation, releasing control of the at least one antenna includes disabling data transmission from the LTE circuitry to the at least one antenna 110.

In a particular implementation, the data may include a criticality bit indicating whether an operation corresponding to the request is critical, and the data may indicate a duration of performance of the operation. For example, the request 130 may include the criticality bit 132 and may indicate a value representing the duration 134. The response may include an acknowledgement (ACK) if the criticality bit has a first value. Additionally, the method 700 may include releasing control of the at least one antenna at the LTE circuitry in response to the criticality bit having the first value. For example, if the criticality bit 132 has a first value indicating the request 130 corresponds to a critical operation, the response 140 may include an ACK and the LTE circuitry 106 may release control of the at least one antenna 110. To further illustrate, the LTE circuitry 106 may release control of the at least one antenna 110 at step 206, and the LTE circuitry 106 may send the ACK to the WLAN circuitry 104 at step 208 of FIG. 2. Releasing control of the at least one antenna at the LTE circuitry may include causing a switch to couple the at least one antenna to the WLAN circuitry. Alternatively, releasing control of the at least one antenna at the LTE circuitry may include preventing an application associated with the LTE circuitry from sending or receiving data via the at least one antenna. Additionally, the method 700 may further include receiving a release message at the LTE circuitry from the WLAN circuitry after performance of the operation at the WLAN circuitry is complete and regaining control of the at least one antenna at the LTE circuitry after receiving the release message. For example, the LTE circuitry 106 may receive the release message 142 from the WLAN circuitry 104 when performance of the operation at the WLAN circuitry 104 is complete. The WLAN circuitry 104 may release control of the at least one antenna 110 and the LTE circuitry 106 may regain control of the at least one antenna 110, as described with reference to FIG. 2. In a particular implementation, regaining control of the at least one antenna may include causing a switch to couple the at least one antenna to the LTE circuitry. For example, the LTE circuitry 106 may cause a switch to couple the at least one antenna 110 to the LTE circuitry 106. As another example, a processor included in the LTE circuitry 106 may begin sending and/or receiving data using the at least one antenna 110. In another particular implementation, the release message may be received prior to expiration of a time period corresponding to the duration indicated by the data. For example, the operation may be performed in less time than indicated by the duration 134, and the release message 142 may be received at the LTE circuitry 106 in less time than indicated by the duration 134.

In a particular implementation, the method 700 further includes determining whether to release control of the at least one antenna at the LTE circuitry based on the duration when the criticality bit has a second value. For example, the LTE circuitry 106 determines whether to release control of the at least one antenna 110 based on the duration 134 if the criticality bit 132 has the second value (indicating the corresponding operation is not critical). Additionally, the method 700 may include releasing control of the at least one antenna at the LTE circuitry in response to the criticality bit having a second value and the duration failing to exceed an estimated duration of time before a next expected operation at the LTE circuitry. For example, the LTE circuitry 106 may determine to release control of that at least one antenna 110 at step 304 of FIG. 3. The response may include an acknowledgement (ACK). For example, the response 140 may include an ACK when the LTE circuitry 106 determines to release control of the at least one antenna 110, and the LTE circuitry 106 may release control of that at least one antenna 110 at step 306 of FIG. 3. The method 700 may further include receiving a release message at the LTE circuitry from the WLAN circuitry after performance of the operation at the WLAN circuitry is complete, regaining control of the at least one antenna at the LTE circuitry after receiving the release message, and sending or receiving at least one data transmission at the LTE circuitry via the at least one antenna in response to regaining control of the at least one antenna at the LTE circuitry. For example, the WLAN circuitry 104 release control of the at least one antenna 110 at step 312 and may send the release message 142 to the LTE circuitry 106 at step 314 of FIG. 3, and after the WLAN circuitry 104 releases control of the at least one antenna 110, the LTE circuitry 106 may regain control of the at least one antenna 110 and send or receive data using the at least one antenna 110.

Alternatively, the method 700 may include maintaining control of the at least one antenna at the LTE circuitry in response to the criticality bit having a second value and the duration value exceeding an estimated duration of time before a next expected operation at the LTE circuitry. For example, the LTE circuitry 106 may determine not to release the at least one antenna 110 at step 404 of FIG. 4 based on the duration 134 exceeding or being equal to a duration of time before a next scheduled operation at the LTE circuitry 106. The response may include a negative acknowledgement (NACK). For example, when the LTE circuitry 106 determines not to grant the request 130, the LTE circuitry 106 may send a NACK as the response 140, as described at step 406 of FIG. 4. Additionally, the method 700 may include receiving, at the LTE circuitry from the WLAN circuitry, a second request for control of the at least one antenna. The method 700 may also include sending a second response from the LTE circuitry to the WLAN circuitry based on second data included in the second request. For example, the WLAN circuitry 104 may send a second request to the LTE circuitry 106 at step 408 of FIG. 4, and the LTE circuitry 106 may send a second response to the WLAN circuitry 104 in response to the second request. In some implementations, the method 700 further includes releasing control of the at least one antenna at the LTE circuitry based on a second duration value included in the second data, where the second response includes a second acknowledgement (ACK). For example, the LTE circuitry 106 may determine to release control of the at least one antenna 110 at step 410 and may release control of the at least one antenna 110 at step 412 of FIG. 4. The LTE circuitry 106 may send an ACK to the WLAN circuitry 104 in response to the second request at step 414 of FIG. 4. The method 700 may further include maintaining control of the at least one antenna at the LTE circuitry based on a second duration value included in the second data. The second response may include a second negative acknowledgement (NACK). In some implementations, the second NACK triggers an error at the WLAN circuitry. For example, the LTE circuitry 106 may determine to maintain control of the at least one antenna 110 based on the second request at step 510, and the LTE circuitry 106 may transmit a second NACK to the WLAN circuitry 104 at step 512 of FIG. 5. Receiving the second NACK may trigger an error at the WLAN circuitry 104 at step 514 of FIG. 5.

In a particular implementation, the data (included in the request) includes a count value indicating a periodicity of the request, the data includes a criticality bit indicating whether an operation corresponding to the request is critical, and the data includes a duration value that indicates a duration of performance of the operation. For example, the request 130 may include the criticality bit 132, the duration 134, and the count value 136. The count value 136 may indicate a periodicity of the request 130. The response may include an acknowledgement (ACK) if the criticality bit has a first value. Additionally, the method 700 may further include releasing control of the at least one antenna at the LTE circuitry in response to the criticality bit having the first value. For example, if the criticality bit 132 has the first value (indicating the corresponding operation is critical), the LTE circuitry 106 may release control of the at least one antenna 110 at step 606 of FIG. 6. The LTE circuitry 106 may also transmit an ACK as the response 140 to the WLAN circuitry 104, at step 608 of FIG. 6. Additionally, the method 700 may include maintaining a timer in response to receiving the request, receiving a release message at the LTE circuitry from the WLAN circuitry after performance of the operation at the WLAN circuitry is complete, regaining control of the at least one antenna at the LTE circuitry in response to receiving the release message, and, in response to the timer reaching a value matching the count value, releasing control of the at least one antenna at the LTE circuitry and resetting the timer. For example, the LTE circuitry 106 may start the timer at step 606 and the WLAN circuitry 104 may send the release message 142 to the LTE circuitry 106 at step 614 at FIG. 6. After the timer reaches the count value 136 at step 616, the LTE circuitry 106 may release control of the at least one antenna 110 and reset the timer at step 618 of FIG. 6. The method 700 may also include receiving a termination message at the LTE circuitry from the WLAN circuitry and terminating operation of the timer in response to receiving the termination message. For example, if the periodic operation is no longer scheduled for performance at the WLAN circuitry 104, the WLAN circuitry 104 may send the termination message 144 to the LTE circuitry 106 and the LTE circuitry 106 may terminate operation of the timer based on receiving the termination message 144.

In a particular implementation, when the request is received, the LTE circuitry is operating in an enabled mode, the WLAN circuitry is operating in an enabled mode, and the wireless device is not in an associated state with any other wireless device via the WLAN circuitry. For example, the message-based sharing described with reference to FIGS. 1-6 may be performed when an LTE mode and a WLAN mode of the wireless device 102 are both enabled and when the wireless device 102 is not in an associated state with (e.g., is not connected to) any other wireless device via a WLAN. In another particular implementation, the LTE circuitry and the WLAN circuitry may be integrated within a modem of the wireless device. For example, the wireless device 102 may include a modem that includes the WLAN circuitry 104 and the LTE circuitry 106.

In a particular implementation, the request may be received via an interface coupled to the WLAN circuitry and the LTE circuitry. For example, the WLAN circuitry 104 may transmit the request 130 to the LTE circuitry 106 via the interface 108. The interface 108 may include a wireless coexistence interface 2 (WCI-2) or a shared memory interface.

The method 700 of FIG. 7 may enable sharing of at least one antenna between WLAN circuitry and LTE circuitry. The method 700 may enable sharing with more flexibility than sharing an antenna using a time division scheme.

Figure 8:
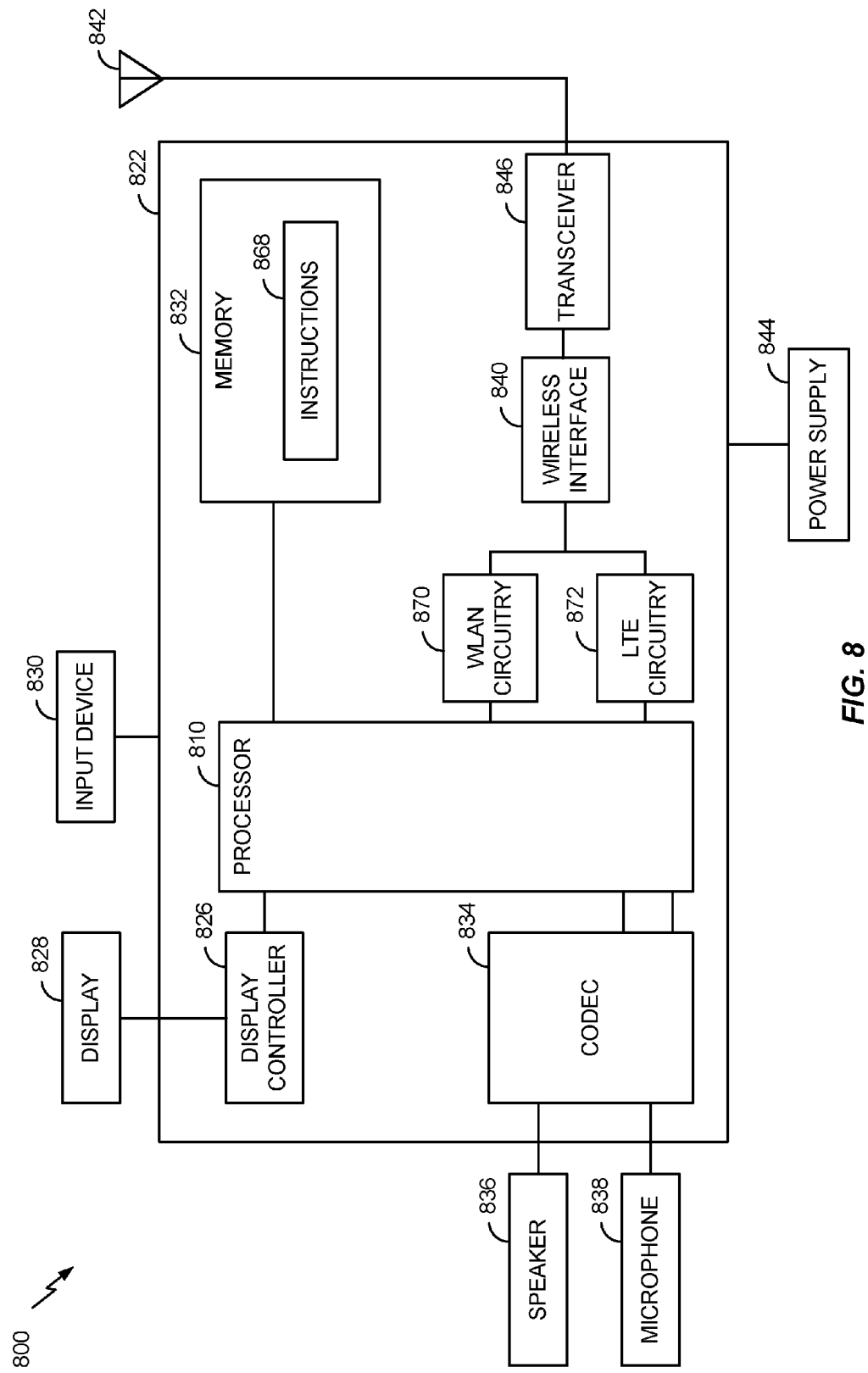
FIG. 8 is a block diagram of a wireless device operable to support various aspects of one or more methods, systems, apparatuses, and/or computer-readable media disclosed herein.

Referring to FIG. 8, a block diagram of a particular illustrative implementation of a wireless communication device 800 is depicted. The device 800 includes a processor 810, such as a digital signal processor (DSP), coupled to a memory 832. In an illustrative implementation, the device 800, or components thereof, may correspond to the wireless device 102 of FIG. 1, or components thereof.

The memory 832 includes instructions 868 (e.g., executable instructions) such as computer-readable instructions or processor-readable instructions. The instructions 868 may include one or more instructions that are executable by a computer, such as the processor 810. The processor 810 may be configured to execute software (e.g., a program of one or more instructions 868) stored in the memory 832 (e.g., a non-transitory computer-readable medium). Additionally or alternatively, the processor 810 may be configured to implement one or more instructions stored in a memory of a wireless interface 840 (e.g., an Institute of Electrical and Electronics Engineers (IEEE) 802.11 compliant interface). For example, the wireless interface 840 may be configured to operate in accordance with one or more wireless communication standards, including one or more IEEE 802.11 standards and one or more NAN standards. In a particular implementation, the processor 810 may be configured to operate in accordance with the method 700 of FIG. 7.

The device 800 may also include wireless local area network (WLAN) circuitry 870 and long term evolution (LTE) circuitry 872. The WLAN circuitry 870 may be configured to perform communications with a WLAN, and the LTE circuitry 872 may be configured to perform communications with a LTE network. In a particular implementation, the LTE network may be a LTE-U network that performs operations via the 5 GHz Unlicensed Spectrum (or via sub-bands thereof, as described with reference to FIG. 1). The WLAN circuitry 870 and the LTE circuitry 872 may each include processors or controllers, transceiver(s), receiver(s), transmitter(s), antenna interface circuit(s), switch(es), switch control circuitry, duplexer(s), transmit filter(s), receive filter(s), matching circuit(s), mixer(s), amplifier(s), oscillator(s), local oscillator (LO) generator(s), phase-locked loop(s) (PLLs), other circuitry, or a combination thereof. In a particular implementation, the WLAN circuitry 870 may include or correspond to the WLAN circuitry 104 of FIG. 1, and the LTE circuitry 872 may include or correspond to the LTE circuitry 106 of FIG. 1. The wireless interface 840 may be coupled to the processor 810 via the WLAN circuitry 870 and the LTE circuitry 872, and the wireless interface 840 may be coupled to an antenna 842. For example, the wireless interface 840 may be coupled to the antenna 842 via a transceiver 846, such that wireless data received via the antenna 842 may be provided to the processor 810. In some implementations, the antenna 842 may be a single antenna that is shared between the WLAN circuitry 870 and the LTE circuitry 872. Although illustrated as a single antenna, in other implementations, the antenna 842 may include or correspond to a set of antennas that are shared between the WLAN circuitry 870 and the LTE circuitry 872. In some implementations, the antenna 842 corresponds to multiple antennas and enables performance of multiple-input, multiple-output (MIMO) communications. Although illustrated as separate from the wireless interface 840 and the transceiver 846, in some implementations part of (or an entirety of) the wireless interface 840 and the transceiver 846 may be included in the WLAN circuitry 870 and the LTE circuitry 872. In an implementation, a wireless device, such as the device 800, may include a non-transitory computer-readable medium storing instructions that, when executed by a processor, such as the processor 810, cause the processor to receive, at LTE circuitry, such as the LTE circuitry 872, of the wireless device from WLAN circuitry, such as the WLAN circuitry 870, a request for control of the at least one antenna, such as the antenna 842, while the LTE circuitry has control of the at least one antenna. Communications by the LTE circuitry using the at least one antenna may correspond to a first frequency band, communications by the WLAN circuitry using the at least one antenna may correspond to the second frequency band, and the first frequency band may at least partially overlap the second frequency band. In such an implementation, the wireless device additionally may include the non-transitory computer-readable medium storing instructions that, when executed by the processor, cause the processor to send a response from the LTE circuitry to the WLAN circuitry based on data included in the request.

FIG. 8 also illustrates a display controller 826 that can be coupled to the processor 810 and to a display 828. A coder/decoder (CODEC) 834 may also be coupled to the processor 810. A speaker 836 and a microphone 838 may be coupled to the CODEC 834. In some implementations, the processor 810, the display controller 826, the memory 832, the CODEC 834, the WLAN circuitry 870, the LTE circuitry 872, the wireless interface 840, and the transceiver 846 are included in a system-in-package or system-on-chip device 822. In some implementations, an input device 830 and a power supply 844 are coupled to the system-on-chip device 822. Moreover, in a particular aspect, as illustrated in FIG. 8, the display 828, the input device 830, the speaker 836, the microphone 838, the antenna 842, and the power supply 844 are external to the system-on-chip device 822. However, each of the display 828, the input device 830, the speaker 836, the microphone 838, the antenna 842, and the power supply 844 may be coupled to a component of the system-on-chip device 822, such as an interface or a controller.

In a particular implementation, the memory 832 may include a non-transitory computer-readable medium storing instructions, such as the instructions 868, that, when executed by a processor, such as the processor 810, causes the processor 810 to receive, at the LTE circuitry 872 of the device 800 from the WLAN circuitry 870 of the device 800 while the LTE circuitry 872 has control of at least one antenna (e.g., the antenna 842) of the wireless device, a request for control of the at least one antenna. The LTE circuitry 872 and the WLAN circuitry 870 may be configured to communicate using the at least one antenna via a common frequency band. For example, a common frequency band may be associated with communications by the LTE circuitry 872 and the WLAN circuitry 870 while using the at least one antenna 842. The instructions 868 may further cause the processor to send a response from the LTE circuitry 872 to the WLAN circuitry 870 based on data included in the request. In a particular implementation, the common frequency band may include a 5 GHz channel, and the LTE circuitry 872 may include LTE-U circuitry configured to perform wireless communications via the 5 GHz channel.

In conjunction with the described aspects, an apparatus includes means for performing long term evolution (LTE) communications via at least one antenna and via a first frequency band. The means for performing LTE communications may include or correspond to the LTE circuitry 106 of FIG. 1, the LTE circuitry 872, the processor 810, the wireless interface 840, and/or the transceiver 846 of FIG. 8, one or more other structures or circuits configured to perform LTE communications via the at least one antenna and the first frequency band, or any combination thereof. In a particular implementation, the means for performing LTE communications may be configured to perform LTE-Unlicensed (LTE-U) communications via the 5 GHz channel.

The apparatus includes means for performing wireless local area network (WLAN) communications via the at least one antenna and via a second frequency band, the first frequency band at least partially overlapping the second frequency band. The means for performing WLAN communications may include or correspond to the WLAN circuitry 104 of FIG. 1, the WLAN circuitry 870, the processor 810, the wireless interface 840, and/or the transceiver 846 of FIG. 8, one or more other structures or circuits configured to perform WLAN communications via at least one antenna and a second frequency band, or any combination thereof.

The apparatus further includes means for sending a response to the means for performing WLAN communications based on data included in a request received from the means for performing WLAN communications while the means for performing LTE communications has control of the at least one antenna. The request is for control of the at least one antenna. The means sending may include or correspond to an interface and/or a processor (or controller) included in the LTE circuitry 106 of FIG. 1, an interface and/or a processor (or controller) included in the LTE circuitry 872, the processor 810, the wireless interface 840, and/or the transceiver 846 of FIG. 8, one or more other structures or circuits configured to send a response to the means for performing WLAN communications, or any combination thereof. In a particular implementation, the apparatus further includes means for sharing messages between the means for performing WLAN communications and the means for performing LTE communications. The means for sharing may include the interface 108 of FIG. 1, an interface or bus coupled to the WLAN circuitry 870 and the LTE circuitry 872 of FIG. 8, one or more other structures or circuits configured to share messages between the means for performing WLAN communications and the means for performing LTE communications, or any combination thereof.

One or more of the disclosed aspects may be implemented in a system or an apparatus, such as the device 800, that may include a communications device, a personal digital assistant (PDA), a mobile phone, a cellular phone, a navigation device, a computer, a portable computer, a desktop computer, a set top box, an entertainment unit, a fixed location data unit, a mobile location data unit, a monitor, a computer monitor, a television, a tuner, a radio, a satellite radio, a music player, a digital music player, a portable music player, a video player, a digital video player, a digital video disc (DVD) player, a portable digital video player, a vehicle, a component within a vehicle, or any other device that stores or retrieves data or computer instructions, or any combination thereof.

Although one or more of FIGS. 1-8 may illustrate systems, apparatuses, and/or methods according to the teachings of the disclosure, the disclosure is not limited to these illustrated systems, apparatuses, and/or methods. One or more functions or components of any of FIGS. 1-8 as illustrated or described herein may be combined with one or more other portions of another of FIGS. 1-8. Accordingly, no single implementation described herein should be construed as limiting and implementations of the disclosure may be suitably combined without departing form the teachings of the disclosure.

Those of skill would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the disclosure herein may be implemented directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description is provided to enable a person skilled in the art to make or use the disclosed implementations. Various modifications to these implementations will be readily apparent to those skilled in the art, and the principles defined herein may be applied to other implementations without departing from the scope of the disclosure. Thus, the present disclosure is not intended to be limited to the implementations shown herein but is to be accorded the widest scope possible consistent with the principles and novel features as defined by the following claims.

What is claimed is:

1. A method of wireless communication, the method comprising:
   performing a first communication operation associated with a first frequency band using at least one antenna of a wireless device, wherein the first communication operation is initiated by long-term evolution (LTE) circuitry of the wireless device; and
   based on a comparison of a duration of a second communication operation to an estimated duration before a next LTE communication operation, performing the second communication operation associated with a second frequency band using the at least one antenna of the wireless device, wherein the second communication operation is initiated by wireless local area network (WLAN) circuitry of the wireless device, and wherein the first frequency band at least partially overlaps the second frequency band.

2. The method of claim 1, wherein the second communication operation is associated with a criticality value that indicates whether the second communication operation is critical.

3. The method of claim 2, wherein the criticality value indicates that the second communication operation is critical.

4. The method of claim 2, further comprising refraining from performing a third communication operation associated with the second frequency band based on a second criticality value associated with the third communication operation indicating that the third communication operation is not critical.

5. The method of claim 2, further comprising performing a third communication operation associated with the first frequency band using the at least one antenna based on a second duration of a fourth communication operation associated with the second frequency band being greater than the estimated duration.

6. The method of claim 5, further comprising sending a negative acknowledgement (NACK) from the LTE circuitry to the WLAN circuitry based on the second duration being greater than the estimated duration.

7. The method of claim 2, further comprising performing a third communication operation associated with the second frequency band using the at least one antenna based on a criticality value associated with the third communication operation indicating that the third communication operation is critical and a second duration of the third communication operation being greater than the estimated duration.

8. The method of claim 1, further comprising causing a switch to couple the WLAN circuitry to the at least one antenna prior to performing the second communication operation.

9. The method of claim 1, further comprising disabling data transmission from the LTE circuitry to the at least one antenna during performance of the second communication operation.

10. The method of claim 1, further comprising performing a third communication operation associated with the first frequency band using the at least one antenna after completion of the second communication operation.

11. The method of claim 1, wherein the second frequency band comprises a 5 gigahertz (GHz) channel.

12. The method of claim 1, further comprising performing a periodic communication operation associated with the second frequency band using the at least one antenna, wherein the periodic communication operation is performed multiple times, and wherein the periodic communication operation includes the second communication operation.

13. The method of claim 12, wherein a criticality value associated with the periodic communication operation indicates that the periodic communication operation is critical.

14. The method of claim 13, further comprising performing a third communication operation associated with the first frequency band using the at least one antenna after performance of the second communication operation and prior to performance of a fourth communication operation associated with the second frequency band, wherein the periodic communication operation comprises the fourth communication operation.

15. The method of claim 1, wherein the second communication operation is performed based on the duration being less than or equal to the estimated duration.

16. The method of claim 1, further comprising performing a third communication operation associated with the second frequency band using the at least one antenna, wherein a periodic communication operation comprises the second communication operation and the third communication operation.

17. The method of claim 16, wherein the second communication operation and the third communication operation have the same duration.

18. An apparatus comprising:
   at least one antenna;
   long-term evolution (LTE) circuitry configured to initiate performance of a first communication operation associated with a first frequency band using the at least one antenna; and
   wireless local area network (WLAN) circuitry configured to, based on a comparison of a duration of a second communication operation to an estimated duration before a next LTE communication operation, initiate performance of the second communication operation associated with a second frequency band using the at least one antenna, wherein the first frequency band at least partially overlaps the second frequency band.

19. The apparatus of claim 18, wherein the LTE circuitry comprises LTE-Unlicensed (LTE-U) circuitry configured to perform wireless communications via a 5 GHz channel.

20. The apparatus of claim 18, further comprising an interface configured to enable communications between the LTE circuitry and the WLAN circuitry.

21. The apparatus of claim 18, further comprising a switch configured to selectively couple the at least one antenna to the WLAN circuitry or to the LTE circuitry.

22. The apparatus of claim 21, wherein the LTE circuitry is configured to cause the switch to couple the at least one antenna to the WLAN circuitry based on the duration being less than or equal to the estimated duration.

23. The apparatus of claim 21, wherein the LTE circuitry is configured to cause the switch to couple the at least one antenna to the LTE circuitry responsive to completion of the second communication operation.

24. The apparatus of claim 20, wherein the interface comprises a shared memory interface, a wireless coexistence interface 2 (WCI-2), a general purpose input-output (GPIO) interface, or a bus.

25. An apparatus comprising:
  means for performing a long term evolution (LTE) communication operation associated with a first frequency band using at least one antenna; and
  means for performing a wireless local area network (WLAN) communication operation associated with a second frequency band using the at least one antenna, the WLAN communication performed based on a comparison of a duration of the WLAN communication operation to a an estimated duration before a next LTE communication operation, wherein the first frequency band at least partially overlaps the second frequency band.

26. The apparatus of claim 25, wherein the second frequency band comprises a 5 gigahertz (GHz) channel, and wherein the LTE communication operation comprises a LTE-Unlicensed (LTE-U) operation via at least a portion of the 5 GHz channel.

27. The apparatus of claim 25, further comprising means for sharing messages between the means for performing the WLAN communication operation and the means for performing the LTE communication operation.

28. A non-transitory computer-readable medium storing instructions that, when executed by a processor, cause the processor to:
  initiate performance of a first communication operation associated with a first frequency band using at least one antenna of a wireless device, wherein the first communication operation comprises a long-term evolution (LTE) communication operation; and
  based on a comparison of a duration of a second communication operation to an estimated duration before a next LTE communication operation, initiate performance of the second communication operation associated with a second frequency band using the at least one antenna wireless device, wherein the second communication operation comprises a wireless local area network (WLAN) communication operation, and wherein the first frequency band at least partially overlaps the second frequency band.

29. The non-transitory computer-readable medium of claim 28, wherein the LTE communication operation comprises a LTE-Unlicensed (LTE-U) communication operation.

30. The non-transitory computer-readable medium of claim 28, wherein the second communication operation is performed based on the duration being less than or equal to the estimated duration.

* * * * *